(12) United States Patent
Mitsumoto et al.

(10) Patent No.: US 8,199,335 B2
(45) Date of Patent: Jun. 12, 2012

(54) THREE-DIMENSIONAL SHAPE MEASURING APPARATUS, THREE-DIMENSIONAL SHAPE MEASURING METHOD, THREE-DIMENSIONAL SHAPE MEASURING PROGRAM, AND RECORDING MEDIUM

(75) Inventors: Daisuke Mitsumoto, Nagaokakyo (JP); Yuki Honma, Joyo (JP)

(73) Assignee: OMRON Corporation, Kyoto (JP)

( * ) Notice: Subject to any disclaimer, the term of this patent is extended or adjusted under 35 U.S.C. 154(b) by 120 days.

(21) Appl. No.: 12/670,998

(22) PCT Filed: Jul. 4, 2008

(86) PCT No.: PCT/JP2008/062193
§ 371 (c)(1),
(2), (4) Date: Mar. 29, 2010

(87) PCT Pub. No.: WO2009/016924
PCT Pub. Date: Feb. 5, 2009

(65) Prior Publication Data
US 2010/0195114 A1    Aug. 5, 2010

(30) Foreign Application Priority Data
Jul. 27, 2007   (JP) ................................ 2007-196192

(51) Int. Cl.
*G01B 11/24*    (2006.01)
(52) U.S. Cl. ...................................................... 356/601
(58) Field of Classification Search .................. None
See application file for complete search history.

(56) References Cited

U.S. PATENT DOCUMENTS

2006/0151604 A1*   7/2006   Zhu et al. ....................... 235/454
2007/0090189 A1      4/2007   Suwa et al.

FOREIGN PATENT DOCUMENTS

CN           1952595 A      4/2007

(Continued)

OTHER PUBLICATIONS

Office Action Issued in Chinese Application No. 200880100594.6, Dated Apr. 13, 2011 (10 Pages With English Translation).

(Continued)

*Primary Examiner* — Tu Nguyen
(74) *Attorney, Agent, or Firm* — Osha • Liang LLP

(57) ABSTRACT

An apparatus for measuring a three-dimensional shape of a target object by analyzing an optical pattern projected onto the target object has an optical pattern projecting device that projects the optical pattern onto a portion of a measurement surface on which the target object is placed, the optical pattern having brightness changing periodically according to a position, a first line sensor that images an optical pattern-emitted region onto which the optical pattern is projected, a second line sensor that images an optical pattern-non-emitted region onto which the optical pattern is not projected, and a processing device that calculates a phase of the optical pattern at a pixel included in an image obtained by removing background information from images taken by the first and second line sensors based on a brightness value of the pixel and a neighboring pixel in the image, and calculates height information based on the calculated phase.

18 Claims, 15 Drawing Sheets

FOREIGN PATENT DOCUMENTS

| | | |
|---|---|---|
| JP | 2002-286433 A | 10/2002 |
| JP | 2004-117186 A | 4/2004 |
| JP | 2005-098884 A | 4/2005 |
| JP | 2005-140537 A | 6/2005 |
| JP | 2007-114071 A | 5/2007 |
| JP | 2007-155600 A | 6/2007 |

OTHER PUBLICATIONS

Patent Abstracts of Japan, Publication No. 2002-286433, dated Oct. 3, 2002, 1 page.

Patent Abstracts of Japan, Publication No. 2004-117186, dated Apr. 15, 2004, 1 page.

International Search Report issued in PCT/JP2008/062193, mailed on Sep. 30, 2008, with translation, 10 pages.

Written Opinion issued in PCT/JP2008/062193, mailed on Sep. 30, 2008, 3 pages.

JP Examination Report in Japanese Patent Application No. 2007-196192, Dated Oct. 18, 2011. (2 Pages).

\* cited by examiner

THREE-DIMENSIONAL SHAPE MEASURING APPARATUS, THREE-DIMENSIONAL SHAPE MEASURING METHOD, THREE-DIMENSIONAL SHAPE MEASURING PROGRAM, AND RECORDING MEDIUM

TECHNICAL FIELD

The present invention relates to a three-dimensional shape measuring apparatus, a three-dimensional shape measuring method, a three-dimensional shape measuring program, and recording medium which measures a three-dimensional shape of a target object by analyzing an optical pattern projected onto the target object.

BACKGROUND ART

An example of means for obtaining three-dimensional shape information on an object by image analysis includes a method of analyzing a deformation amount of an optical pattern changed according to a three-dimensional shape of a target object by projecting the optical pattern onto the target object existing in a predetermined imaging visual field. A light-section method, a spatial encoding method, a fringe analysis method can be cited as typical examples. These methods are based on the principle of triangulation. Among others, for the fringe analysis method, there are proposed many techniques such as spatial fringe analysis and temporal fringe analysis, and the fringe analysis method is known as a technique in which high measurement precision is obtained.

In these techniques, usually an area sensor is used to read the target object onto which the optical pattern is projected. However, when the area sensor is used, because the target object does not fit into one imaging visual field, it is necessary that the area sensor be moved in both a lengthwise direction and a crosswise direction to take the one imaging visual field while the one imaging visual field is divided into plural portions, which results in the imaging time being lengthened.

Patent Documents 1 and 2 propose a three-dimensional shape measuring method in which a line sensor is used instead of the area sensor. Especially, the measuring method disclosed in Patent Document 1 is performed by the following steps. The target object onto which the optical pattern is projected is taken by a line camera, subsequently the phase of the projected optical pattern is shifted by moving the target object, and the target object onto which the optical pattern having shifted phase is projected is taken by another line camera; the above processes are repeated plural times. The optical patterns included in the plural taken images are analyzed to measure the three-dimensional shape based on the temporal fringe analysis method (phase shift method).

In a three-dimensional shape measuring apparatus proposed in Patent Document 2, the three-dimensional shape is measured by the following method. The target object onto which the optical pattern is projected is taken separately by two line cameras placed at different positions, and the three-dimensional shape is measured from the two taken images based on the stereo method.

Patent Document 1 proposes the three-dimensional shape measuring method in which a line sensor is used instead of the area sensor. The measuring method disclosed in Patent Document 1 is performed by the following steps. The target object onto which the optical pattern is projected is taken by the line camera, subsequently the phase of the projected optical pattern is shifted by moving the target object, and the target object onto which the optical pattern having shifted phase is projected is taken by another line camera; the above processes are repeated plural times. The optical patterns included in the plural taken images are analyzed to measure the three-dimensional shape based on the temporal fringe analysis method (phase shift method).

In the three-dimensional shape measuring apparatus proposed in Patent Document 2, the three-dimensional shape is measured by the following method. The target object onto which the optical pattern is projected is taken separately by two line cameras placed at different positions, and the three-dimensional shape is measured from the two taken images based on the stereo method.

Patent Document 1: Japanese Unexamined Patent Publication No. 2002-286433 (published on Oct. 3, 2002)
Patent Document 2: Japanese Unexamined Patent Publication No. 2004-117186 (published on Apr. 15, 2004)

In the conventional techniques, however, there is difficulty in arranging the line sensor or it takes a long time to take the image.

For example, the temporal fringe analysis method of taking the image of the same portion of the target object plural times from the same angle while changing the phase of the optical pattern projected onto the target object is used as the fringe analysis method in the technique described in Patent Document 1. In this case, it is necessary that plural line sensors be used and that all the line sensors be strictly arranged in parallel in order to taken the image of the same portion of the target object conveyed in a linear direction. It is also necessary that all the line sensors be arranged at the same distance from a reference plane on which the target object is placed. Additionally, it is necessary that all the line sensors be arranged in the same attitude in order to taken the image from the same angle. For example, four line sensors are used in Patent Document 1. However, it is actually difficult for the four line sensors to be arranged as described above.

Thus, in the technique described in Patent Document 1, arrangement of the line sensor becomes difficult. In addition, because the plural line sensors are required, upsizing, price increase, and the increased frequency of troubles might arise in the measuring apparatus.

In using the temporal fringe analysis method, there is also a method of taking the image of the target object plural times with one line sensor instead of the plural line sensors. In this case, because parallel processing cannot be performed, the amount of time for taking the image necessary for analysis becomes several times (for example, four times when the four images are taken) compared with the case where the plural line sensors are used. Therefore, the time necessary to the measurement is lengthened.

On the other hand, in the technique described in Patent Document 2, a three-dimensional shape is measured by the stereo method from the two images obtained by the two line sensors, and it is necessary to correctly know the geometric arrangement of the two line sensors to measure the three-dimensional shape by the stereo method. Therefore, in this case, it is also necessary that the two line sensors be correctly arranged, which results in the arrangement of the line sensor becoming difficult. Furthermore, since the method of the Patent Document 2 uses the stereo method, it is difficult to improve the measurement precision of the three-dimensional shape to a resolution not more than a pixel of the line sensor. Therefore, the measurement precision decreases.

SUMMARY

One or more embodiments of the present invention provides a three-dimensional shape measuring apparatus and a three-dimensional shape measuring method capable of measuring three-dimensional shape information of a target object over a wide visual field in a swift and easy manner.

The three-dimensional shape measuring apparatus according to one or more embodiments of the present invention uses a spatial fringe analysis method. In the spatial fringe analysis method, the phase of an optical pattern in a pixel included in an image read by the line sensor is calculated based on a brightness value of the pixel and a neighboring pixel in the image, and height information of the target object is calculated based on the calculated phase.

Specifically, one or more embodiments of the present invention provides a three-dimensional shape measuring apparatus for measuring a three-dimensional shape of a target object by analyzing an optical pattern projected onto the target object, the three-dimensional shape measuring apparatus including: optical pattern projecting means that projects the optical pattern onto a portion of a measurement surface on which the target object is placed, the optical pattern having brightness changing periodically according to a position; a first line sensor that images an optical pattern-emitted region onto which the optical pattern of the target object is projected; a second line sensor that images an optical pattern-non-emitted region onto which the optical pattern of the target object is not projected; and processing means that calculates a phase of the optical pattern at a pixel included in an image obtained by removing background information from images taken by the first and second line sensors based on a brightness value of the pixel and a neighboring pixel in the image, and calculates height information of the target object based on the calculated phase, wherein the first and second line sensors are arranged at such positions that the first and second line sensors can respectively image the optical pattern-emitted region and the optical pattern-non-emitted region at a time.

According to the above configuration, the three-dimensional shape measuring apparatus is arranged with a first line sensor for reading the optical pattern projected onto the target object as an image and a second line sensor for reading an image of the target object onto which the optical pattern is not projected. In this way, the imaging region can be extended in the longitudinal direction (the sub-scan direction) of the line sensor by using the line sensor instead of the area sensor. Therefore, the target object can be imaged at a high resolution while reducing the number of times the target object is moved relatively in the sub-scan direction with respect to the line sensor (preferably, the number of times the target object is moved is reduced to zero), which enables measuring the three-dimensional shape information in a swift and precise manner.

The three-dimensional shape measuring apparatus calculates the shape information of the target object by analyzing the optical pattern projected onto the target object. The brightness of this optical pattern is periodically changed according to a position, and the height of the target object at a certain position can be calculated based on how much the phase of the optical pattern projected onto the position of the target object is shifted from a reference phase.

The phase of the optical pattern projected onto each section of the target object is calculated from a brightness value of an image taken by the line sensor. More specifically, based on the brightness value of a pixel (hereinafter referred to as an "attention pixel") corresponding to a certain position of the target object onto which the optical pattern is projected, the phase corresponding to the brightness value is calculated. However, when the position (i.e., phase) and the brightness value (i.e., displacement) of the optical pattern are represented by a continuous function having periodicity, a phase giving a certain brightness value (displacement) at one point exists at least at two points in the same period. For example, in the function expressed by $y = \sin \theta$, the phase $\theta$ which gives the displacement $y=0$ exists at two points of $0$ and $\pi$. For this reason, the phase corresponding to the brightness value cannot be uniquely determined only from the brightness value (displacement) of the attention pixel.

At this occasion, in the conventional technique, the temporal fringe analysis method is used to determine the phase of the attention pixel. That is, two possible phases of the optical pattern corresponding to the brightness value are determined based on the brightness value of the attention pixel, and further the one phase of the optical pattern at the attention pixel is uniquely determined based on the brightness value of the corresponding pixel in another image taken with a shift in the phase of the optical pattern. Therefore, even where the reflection characteristic of the target object is strictly uniform, it is necessary to take at least two images showing the same section of the target object, and totally, two scans or more are required on the same section of the target object.

In contrast, the three-dimensional shape measuring apparatus according to one or more embodiments of the present invention includes an image analyzing unit that calculates the phase of the optical pattern at a pixel included in an image read by the line sensor, based on a brightness value of the pixel and a neighboring pixel. That is, the phase of the optical pattern at the attention pixel is roughly identified based on the brightness value of the pixel, and the phase of the optical pattern at the pixel is uniquely identified based on the brightness value of the pixel around the attention pixel.

This principle will be described. In a continuous function having periodicity, a phase giving a certain displacement exists at least at two points in the same period, but displacements in proximity to the two phases are different from each other. For example, in the above example, the phase $\theta$ which gives the displacement $y=0$ exists at two points of $0$ and $\pi$. However, the brightness value (displacement) of the neighboring pixels is different between a case where the phase of the attention pixel is 0 and a case where the phase thereof is $\pi$. For example, when the phase is 0 in the attention pixel, the brightness value of the neighboring pixels whose phase is slightly smaller than that of the attention pixel becomes smaller than the brightness value of the attention pixel. On the other hand, when the phase is $\pi$ in the attention pixel, the brightness value of the neighboring pixels whose phase is slightly smaller than that of the attention pixel becomes larger than the brightness value of the attention pixel. Accordingly, the one phase can be uniquely determined as the phase of the optical pattern based on the brightness values of the neighboring pixels of the attention pixel.

In the three-dimensional shape measuring apparatus according to one or more embodiments of the present invention, the optical pattern projecting means projects the optical pattern onto a region of the measurement surface on which the target object is placed. The first line sensor is arranged at a position such that the first line sensor images the optical pattern-emitted region onto which the optical pattern is projected. The second line sensor is arranged at a position such that the second line sensor images the optical pattern-non-emitted region onto which the optical pattern is not projected.

In order to improve the measurement precision, a method may be considered that includes the steps of taking an image onto which the optical pattern is projected, taking an image onto which the optical pattern is not projected, and comparing the images so as to remove background information. In this case, if a single line sensor takes an image, the line sensor needs to take the image multiple times in order to take the image onto which the optical pattern is projected and take the image onto which the optical pattern is not projected.

Therefore, it is necessary to perform precise positioning using such as a linear scaler in order to correctly adjust the imaging position when imaging is performed multiple times. Furthermore, it is necessary to arrange an image memory for temporarily storing images taken in each of multiple shots until the images required for calculation are obtained. Still furthermore, it is necessary to arrange elements such as a foldable mirror and a half mirror for switching between projection and non-projection of the optical pattern (FIG. 16).

However, in the three-dimensional shape measuring apparatus according to one or more embodiments of the present invention, the optical pattern-emitted region and the optical pattern-non-emitted region are arranged so as not to overlap with each other, and the first line sensor and the second line sensor are arranged so that the first line sensor and the second line sensor can image the above regions at a time. In the above configuration, it is not necessary to image the entire measurement region by moving the target object multiple times during calculation of an image obtained by removing background information from the image taken by the first and second line sensors. Therefore, the three-dimensional shape measuring apparatus according to one or more embodiments of the present invention achieves the effect of being able to take the required image with only one shot.

Therefore, it takes less time to take the image, it is not necessary to arrange a mechanism such as a half mirror for switching between emission and non-emission of the optical pattern, it is not necessary to arrange a linear scaler in order to correctly adjust the position when imaging is performed multiple times, and it is possible to reduce the cost and achieve a faster imaging rate.

One or more embodiments of the present invention provides a three-dimensional shape measuring method for a three-dimensional shape measuring apparatus that measures a three-dimensional shape of a target object by analyzing an optical pattern projected onto the target object, wherein the three-dimensional shape measuring apparatus includes optical pattern projecting means, a first line sensor, and a second line sensor, and wherein the first and second line sensors are arranged at such positions that the first and second line sensors can respectively image, at a time, an optical pattern-emitted region onto which the optical pattern of the target object is projected and an optical pattern-non-emitted region onto which the optical pattern of the target object is not projected, the three-dimensional shape measuring method including: an optical pattern projecting step in which the optical pattern projecting means projects the optical pattern onto a portion of a measurement surface on which the target object is placed, the optical pattern having brightness changing periodically according to a position; an imaging step in which the first line sensor images the optical pattern-emitted region, and the second line sensor images the optical pattern-non-emitted region; and a calculation step including: calculating a phase of the optical pattern at a pixel included in an image obtained by removing background information from images taken by the first and second line sensors, based on a brightness value of the pixel and a neighboring pixel in the image; and calculating height information of the target object based on the calculated phase.

According to the above configuration, the three-dimensional shape measuring method can be provided that achieves the same effect as the above-described three-dimensional shape measuring apparatus.

The above calculation step in the three-dimensional shape measuring method can be executed on a computer.

BRIEF DESCRIPTION OF THE DRAWINGS

FIG. 4(a) is a top view and FIG. 4(b) is a side view.

FIG. 5(a) is a top view and FIG. 5(b) is a waveform diagram showing variation of brightness on the reference plane and variation of brightness at a protrusion.

FIG. 6(a) is a top view of the projected optical pattern and FIG. 6(b) is a cross sectional view showing a structure of a light projector section of the projector unit 20.

FIG. 7(a) shows an example of an optical pattern-emitted region onto which the optical pattern is projected and FIG. 7(b) shows an example of an optical pattern-non-emitted region onto which the optical pattern is not projected but the uniform illumination is emitted.

DESCRIPTION OF SYMBOLS

Figure 1:
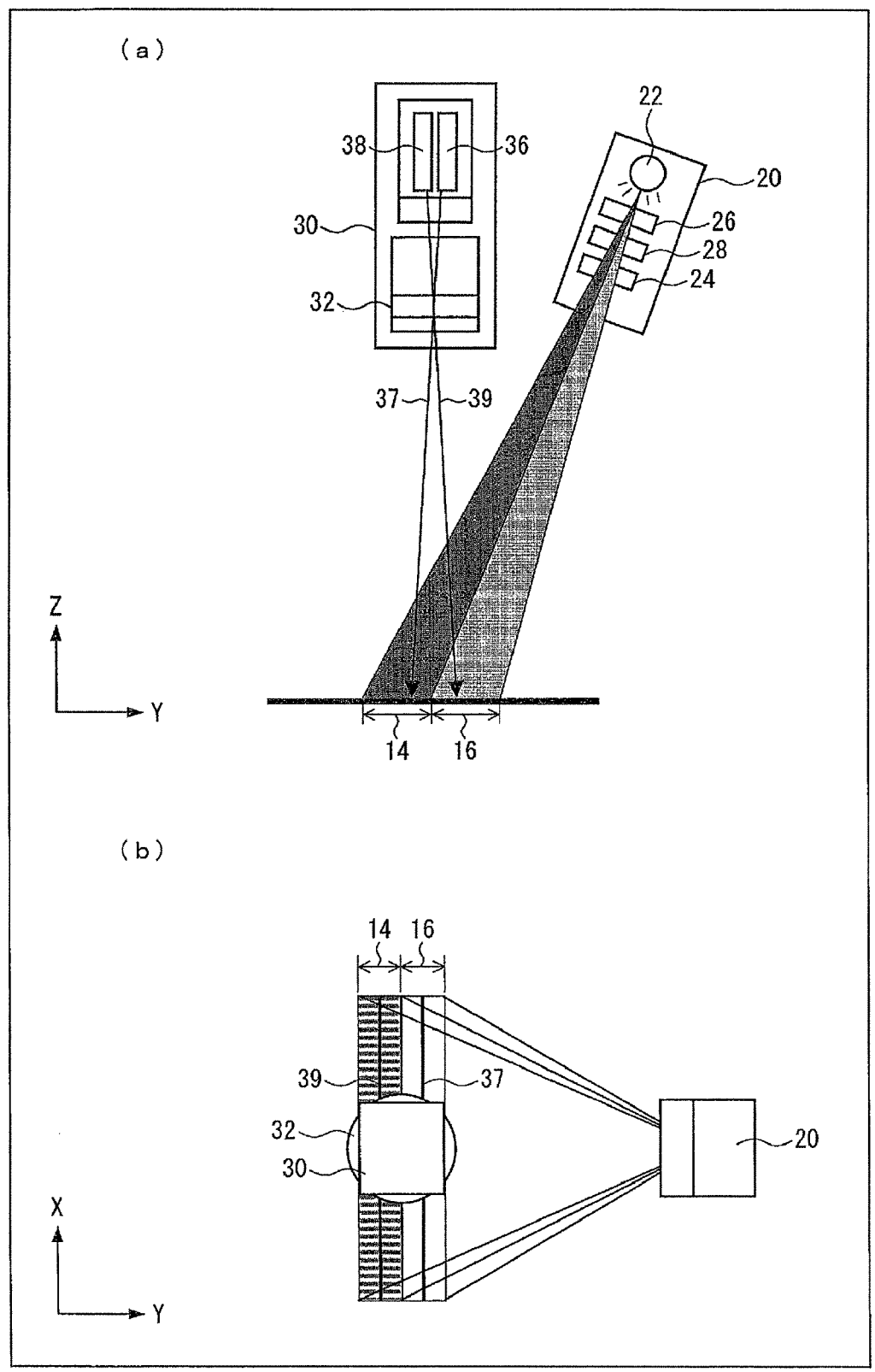
FIG. 1 shows an embodiment of the present invention, and is a cross sectional view and a top view showing a configuration of an essential portion of a three-dimensional shape measuring apparatus.

10 Three-dimensional shape measuring apparatus
12 Target object
14 Optical pattern-emitted region
16 Optical pattern-non-emitted region
20 Projector unit (projecting means)
22 Light source
24 Projector lens
26 Pattern generator (optical pattern projecting means)
28 Optical separation unit
30 Imaging unit
31 Light source
32 Imaging lens
34 Mirror
36 First line sensor
37 First region
38 Second line sensor
39 Second region
40 Image analysis/drive control unit (processing means)
42 Capture board
44 Controller
46 CPU
48 RAM
50 Conveyance unit
52 Conveyance stage
54 Servo motor

DETAILED DESCRIPTION

First Embodiment

Embodiments of the present invention will be described below with reference to FIGS. 1 to 11. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 2:
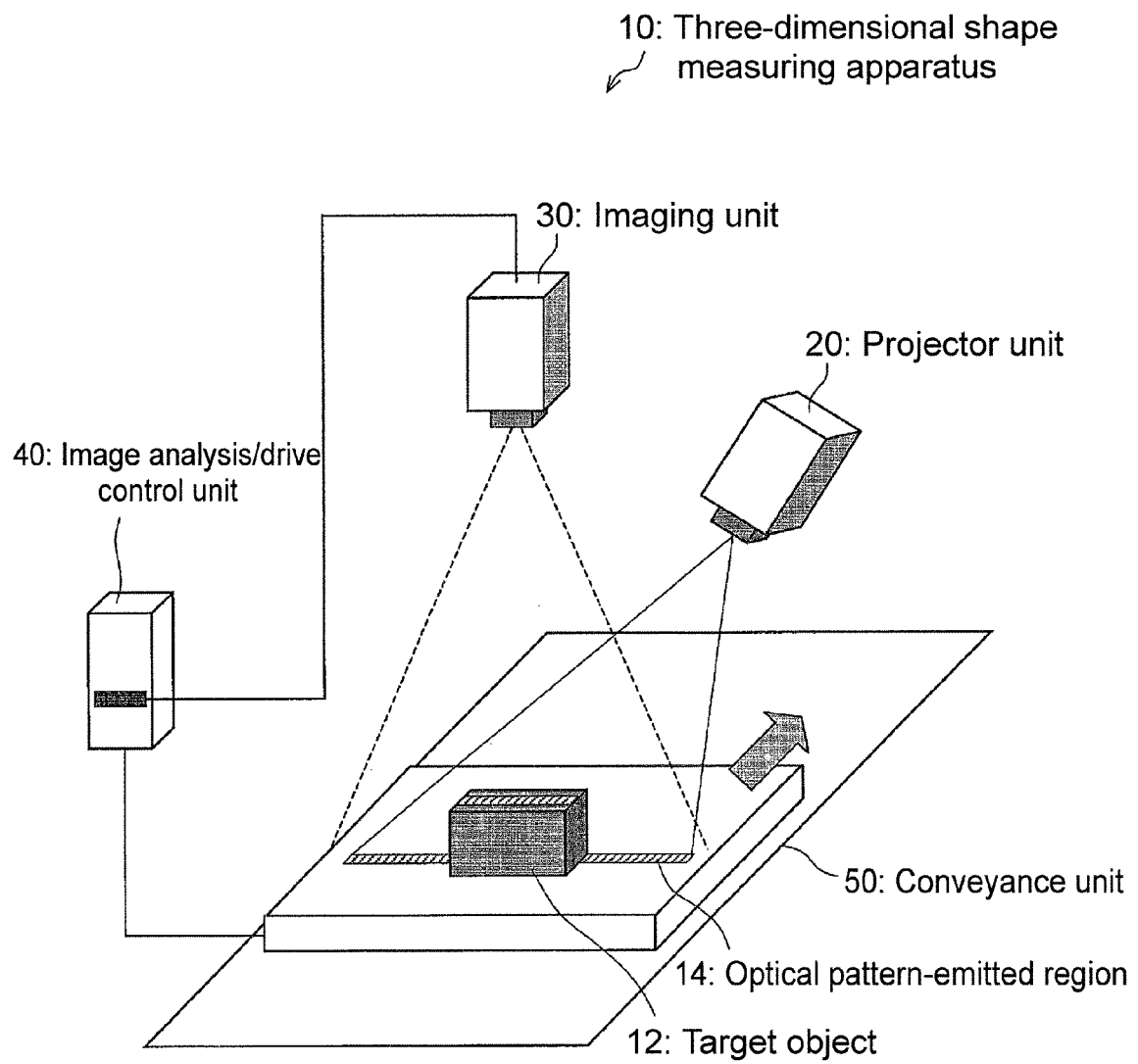
FIG. 2 is a conceptual view showing a physical structure of the three-dimensional shape measuring apparatus.
Figure 3:
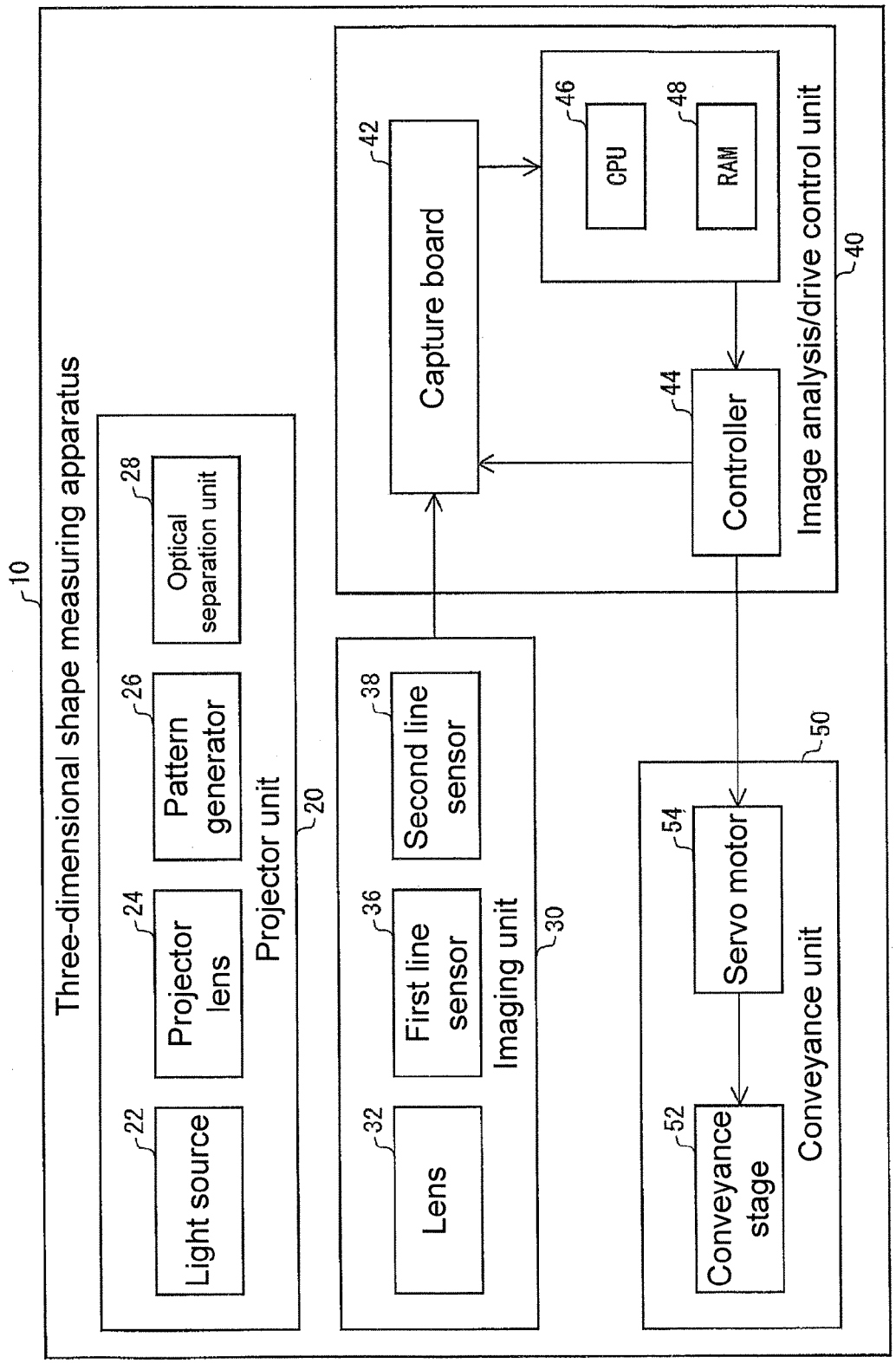
FIG. 3 is a functional block diagram showing the configuration of the essential portion of the three-dimensional shape measuring apparatus.

FIG. 1 is a view showing a schematic configuration of a three-dimensional shape measuring apparatus 10 according to the present embodiment. FIG. 1(*a*) is a cross sectional view and FIG. 1(*b*) is a top view. FIG. 2 is a conceptual view showing a physical structure of the three-dimensional shape measuring apparatus 10. FIG. 3 is a functional block diagram showing a configuration of an essential portion of the three-dimensional shape measuring apparatus 10. As shown in FIG. 1 to FIG. 3, the three-dimensional shape measuring apparatus 10 includes a projector unit (projecting means) 20, an imaging unit 30, an image analysis/drive control unit (processing unit) 40, and a conveyance unit 50.

The projector unit 20 projects an optical pattern onto the surface of a target object 12. As shown in FIG. 1, the projector unit 20 includes a light source 22 such as a halogen lamp or a xenon lamp, a projector lens 24 such as a macro lens, a pattern generator 26 which gives a pattern to the light emitted from the light source 22, and an optical separation unit 28 which allows light to pass through or blocks light so as to make clear a boundary between an optical pattern-non-emitted region 16 and an optical pattern-emitted region 14 to which an optical pattern is emitted.

Any pattern such as a sine wave, a triangular wave, and a rectangular wave can be used as the projected optical pattern as long as the pattern has the periodicity according to the position and is able to specify the phase. In the present embodiment, the sine-wave optical pattern is used to contribute to the improvement of the measurement resolution. A pattern generator produced by forming glass or film can be used as the pattern generator 26. Alternatively, the pattern generator 26 may use a liquid crystal to dynamically generate a pattern.

As described above, the imaging unit 30 obtains the image by reading the target object 12 on which the optical pattern is projected. As shown in FIG. 1, the imaging unit 30 includes a first line sensor 36, a second line sensor 38, and an imaging lens 32 such as a macro lens.

The first line sensor 36 is arranged at a position so as to be able image the optical pattern-emitted region 14. The second line sensor 38 is arranged at a position so as to be able to image the optical pattern-non-emitted region 16. The optical pattern-emitted region 14 and the optical pattern-non-emitted region 16 are arranged so as not to overlap with each other in view of the imaging ranges of the first line sensor 36 and the second line sensor 38.

The conveyance unit 50 moves the target object 12 horizontally in a direction indicated by an arrow in FIG. 2 (hereinafter referred to as a "main scan direction") and in a direction perpendicular to the main scan direction (hereinafter referred to as a "sub-scan direction"). As shown in FIG. 3, the conveyance unit 50 includes a conveyance stage 52 on which the target object 12 is placed and a servo motor 54 which drives the conveyance stage 52.

The imaging unit 30 sequentially takes the image while the conveyance unit 50 moves the target object 12 in the main scan direction, which enables the three-dimensional shape to be measured in the whole of the target object 12. When the target object 12 is larger in the sub-scan direction than the imaging range of the imaging unit 30, the conveyance unit 50 moves the target object 12 in the sub-scan direction, and the imaging unit 30 sequentially takes the image.

The image analysis/drive control unit 40 calculates the three-dimensional shape of the target object 12 by analyzing, through the fringe analysis method, the optical pattern included in the image taken by the imaging unit 30, and gives various instructions to a controller 44. Further, as shown in FIG. 3, the image analysis/drive control unit 40 includes a capture board 42 for capturing the image as digital data from the imaging unit 30, a CPU 46 for performing various controls, and a RAM 48 for storing various pieces of information.

In the present embodiment, the conveyance unit 50 is configured to move the target object 12. Instead of moving the target object 12, the projector unit 20 and the imaging unit 30 may be configured to move in the main scan direction and further in the sub-scan direction. In other words, the conveyance unit 50 may be configured in any way as long as the target object 12 is moved relatively to the projector unit 20 and the imaging unit 30.

The overview of each unit of the three-dimensional shape measuring apparatus 10 will be described. In the three-dimensional shape measuring apparatus 10 according to the present embodiment, the imaging unit 30 is arranged such that the axis of the sub-scan direction thereof is in parallel with the measurement surface of the conveyance stage 52.

Since the optical axis of the imaging unit 30 is in parallel with the measurement surface of the conveyance stage 52, the upper surface of the target object 12 can be imaged with a constant magnification rate. Further, since the optical axis of the imaging unit 30 (the axis of the sub-scan direction) is perpendicular to the main scan direction, a right angle portion is imaged as a right angle portion in a two-dimensional image made of a plural line images that are taken while the target object 12 is conveyed.

The projector unit 20 is arranged such that the optical axis thereof forms a predetermined angle with respect to the optical axis of the imaging unit 30. With this arrangement, the height of the target object 12 can be calculated based on a shift of the optical pattern projected onto the target object 12. It should be noted that the geometric arrangement of the imaging unit 30 and the projector unit 20 may be measured in advance during installation, or may be calculated by calibration.

The operation of the three-dimensional shape measuring apparatus 10 will be hereinafter described. First, in response to an instruction given by the image analysis/drive control unit 40 via the controller 44, the servo motor 54 of the conveyance unit 50 sets the conveyance stage 52 to an initial setting position. This initial setting position is used to determine an imaging start position in the main scan direction when the imaging unit 30 images the target object 12. Preferably, the initial setting position is configured such that the imaging region of the imaging unit 30 covers an end section, in the main scan direction, of the target object 12 placed on the conveyance stage 52 of the conveyance unit 50.

Then, the projector unit 20 projects the optical pattern onto the target object 12. The imaging unit 30 scans the target object 12 onto which the optical pattern is projected, and obtains the image of this target object 12. The image obtained by the imaging unit 30 is transmitted to the image analysis/drive control unit 40, and is converted into digital data by the capture board 42 of the image analysis/drive control unit 40. Then, the CPU 46 of the image analysis/drive control unit 40 calculates height information of the target object 12 by analyzing the optical pattern.

Herein, in the three-dimensional shape measuring apparatus 10 according to the present embodiment, a spatial fringe analysis method is used when the optical pattern in the image is analyzed. Therefore, the height of the target object 12 at each position in the scan region of the imaging unit 30 (the imaging region) can be derived from the image obtained in one scan performed by one line sensor of the imaging unit 30.

Then, according to the control of the image analysis/drive control unit 40, the conveyance unit 50 moves the target object 12 in the main scan direction for a predetermined distance. Accordingly, the imaging region of the imaging unit 30 on the target object 12 and the optical pattern projected by the projector unit 20 are shifted from each other in the main scan direction by the predetermined distance. Thereafter, the imaging unit 30 obtains the image by scanning the target object 12 again. The image obtained here includes a region shifted in the main scan direction by the predetermined distance with respect to the scan region on the target object 12 obtained previously. Likewise, the obtained image is transmitted to the image analysis/drive control unit 40, and three-dimensional information is derived at each position in the new scan region.

In this way, the conveyance unit 50 moves the target object 12 by the predetermined distance again, the imaging unit 30 images the target object 12, and the image analysis/drive control unit 40 analyzes the line image. By repeating the above processing, the three-dimensional shape of the entire target object 12 is measured.

The length information about the three-dimensional shape of the target object 12 in the sub-scan direction and in the main scan direction of the imaging unit 30 is measured by a well-known method. More specifically, the length information of the target object 12 in the sub-scan direction is calculated based on the length of the target object imaged as the line image in the sub-scan direction. On the other hand, the length information of the target object 12 in the main scan direction is calculated based on the moving rate of the conveyance unit 50. In this way, the information about the three-dimensional shape of the target object 12 is obtained by deriving the height information and the length information of the target object 12 in the sub-scan direction and the main scan direction. Alternatively, the length in the sub-scan direction may be obtained by imaging a workpiece arranged at a known interval during calibration and adjusting the focus and the height of the imaging unit so that a desired resolution is obtained at the above point. Even when a workpiece of an unknown size smaller than the imaging visual field is conveyed, the above adjustment enables calculating the size.

The above predetermined distance is preferably the same as the resolution at which the imaging region of the imaging unit 30 is imaged. Therefore, the above steps enable quickly measuring the entire region of the target object 12 without any region left unmeasured.

The imaging performed at a predetermined distance is achieved by causing the imaging unit 30 to perform imaging at a constant interval of time while the conveyance stage 52 is moved at a constant rate. In this case, the controller 44 transmits an imaging drive signal to the imaging unit 30 via the capture board 42, for example, at a constant interval of time in the order of several KHz. The imaging unit 30 uses this drive signal as a trigger to obtain the image of the target object 12 onto which the optical pattern is projected. Likewise, the controller 44 transmits a conveyance drive signal to the conveyance unit 50 at a constant interval of time. The servo motor 54 of the conveyance unit 50 uses this conveyance drive signal as a trigger to drive the conveyance stage 52 at a constant rate. As a result, the target object 12 can be imaged in each predetermined region.

Figure 16:
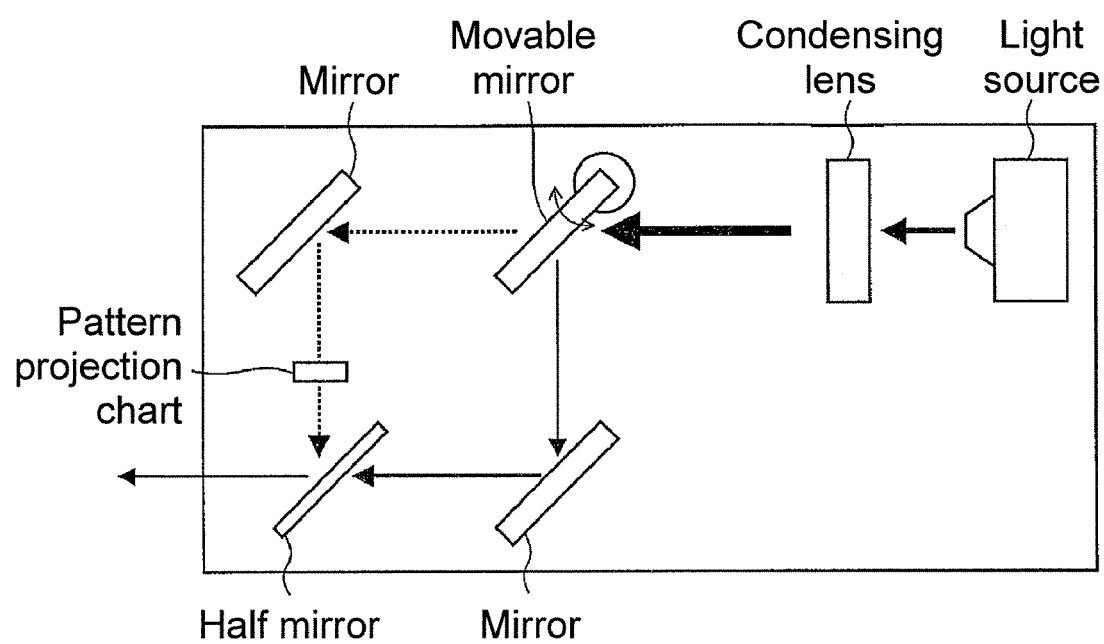
FIG. 16 shows conventional art and is a side view of a structure for switching between projecting state and non-projecting state of an optical pattern.

Conventionally, as shown in FIG. 16, a light emitted from a light source and condensed by a condensing lens is selectively passed through either of two optical projection paths. One of the optical projection paths is for projecting the optical pattern onto the target object via a mirror, a pattern projection chart (pattern generator), and a half mirror while a movable mirror is folded and removed. The other of the optical projection paths is for projecting a uniform illumination, without the optical pattern, onto the target object via the movable mirror, the mirror, and the half mirror.

In the present embodiment, as shown in FIG. 1, the light source 22 emits a light to the pattern generator 26 to generate a light for forming the optical pattern, and the generated light is passed through the optical separation unit 28 so that the light is separated into a light projected onto the optical pattern-emitted region 14 and a light projected onto the optical pattern-non-emitted region 16, which are emitted to the target object 12 and the measurement surface. The first line sensor 36 and the second line sensor 38 are arranged at such positions that the optical pattern-emitted region 14 and the optical pattern-non-emitted region 16 can be imaged respectively at a time. Therefore, an image emitted with the optical pattern and an image emitted without any optical pattern can be taken in one shot.

Therefore, it is not necessary to perform precise positioning using a linear scaler in order to correctly adjust the imaging position when imaging is performed multiple times. Furthermore, it is not necessary to arrange an image memory for temporarily storing images taken in each of multiple shots until the images required for calculation are obtained. Still furthermore, it is not necessary to arrange elements such as a movable mirror and a half mirror for switching between projection and non-projection of the optical pattern. As a result, it takes less time to perform measuring, and it is possible to reduce the cost for structuring the elements, while the conventional optical pattern generator is still used.

Alternatively, instead of using the optical separation unit 28 to separate light into a light projected onto the optical pattern-emitted region 14 and a light projected onto the optical pattern-non-emitted region 16, the configuration of the chart formed on the pattern generator 26 may be changed to form an optical pattern for the optical pattern-emitted region, so that a transparent section and a shielding section are formed in order to emit uniform illumination to the optical pattern-non-emitted region. Alternatively, a uniform illumination projection unit may be arranged to emit, to the optical pattern-non-emitted region, a uniform illumination having the same amount of light as the optical pattern projected by the projector unit 20.

With the above structure, it takes less time to perform measuring, and it is possible to reduce the cost for structuring the elements, as in the case where the optical separation unit 28 is used to separate light into a light projected onto the optical pattern-emitted region 14 and a light projected onto the optical pattern-non-emitted region 16.

Subsequently, the details of image analysis performed by the image analysis/drive control unit 40 will be described. First, the principle of the image analysis method according to the present embodiment will be described.

The image analysis/drive control unit 40 analyzes, based on the spatial fringe analysis method, the line image of the target object 12 onto which the optical pattern is projected. The spatial fringe analysis method is based on the principle of triangulation. The principle of the triangulation, the fringe analysis method, and the spatial fringe analysis method, respectively, will be described below in this order.

The principle of the triangulation will first be described. For the purpose of simple explanation, it is thought that a plane Ph having a height h from a reference plane P0 is observed by an imaging unit Cc having the optical axis perpendicular to the reference plane. It is assumed that a projector unit Cp is arranged at the same height as the imaging unit Cc when viewed from the reference plane P0 and the projector unit Cp projects the optical pattern toward a position of a point O on the reference plane P0.

In the case where the plane Ph which is parallel to the reference plane P0 and separated way from the reference plane by the height h is observed, the optical pattern going to the point O intersects a point P. When viewed from the imaging unit Cc at this moment, the optical pattern projected toward the reference plane P0 is observed at the position P which is shifted by a distance PQ from the position O (namely, position Q) where the optical pattern should normally be observed. The position shift PQ is called phase difference.

When the phase difference can be computed, $$h = \frac{L}{d} \cdot \overline{PQ} \qquad (1)$$

Where $\overline{PQ}$ is a distance between the points P and Q, namely, PQ indicates the phase difference. A variable d represents the distance between the optical axis centers of the imaging unit Cc and the projector unit Cp, a variable L represents the distance from the imaging unit Cc to the reference plane. Both of d and L are known values.

the height h can be computed by the above equation (1).

Then, the fringe analysis method will be described. In the present embodiment, a sine-wave optical pattern is used as the optical pattern projected onto the target object 12. The sine-wave optical pattern shall mean a pattern in which the brightness has graduation expressed by a sine function. In other words, the sine-wave optical pattern means the optical pattern in which the relationship between the position and the brightness is expressed by the sine function.

Figure 4:
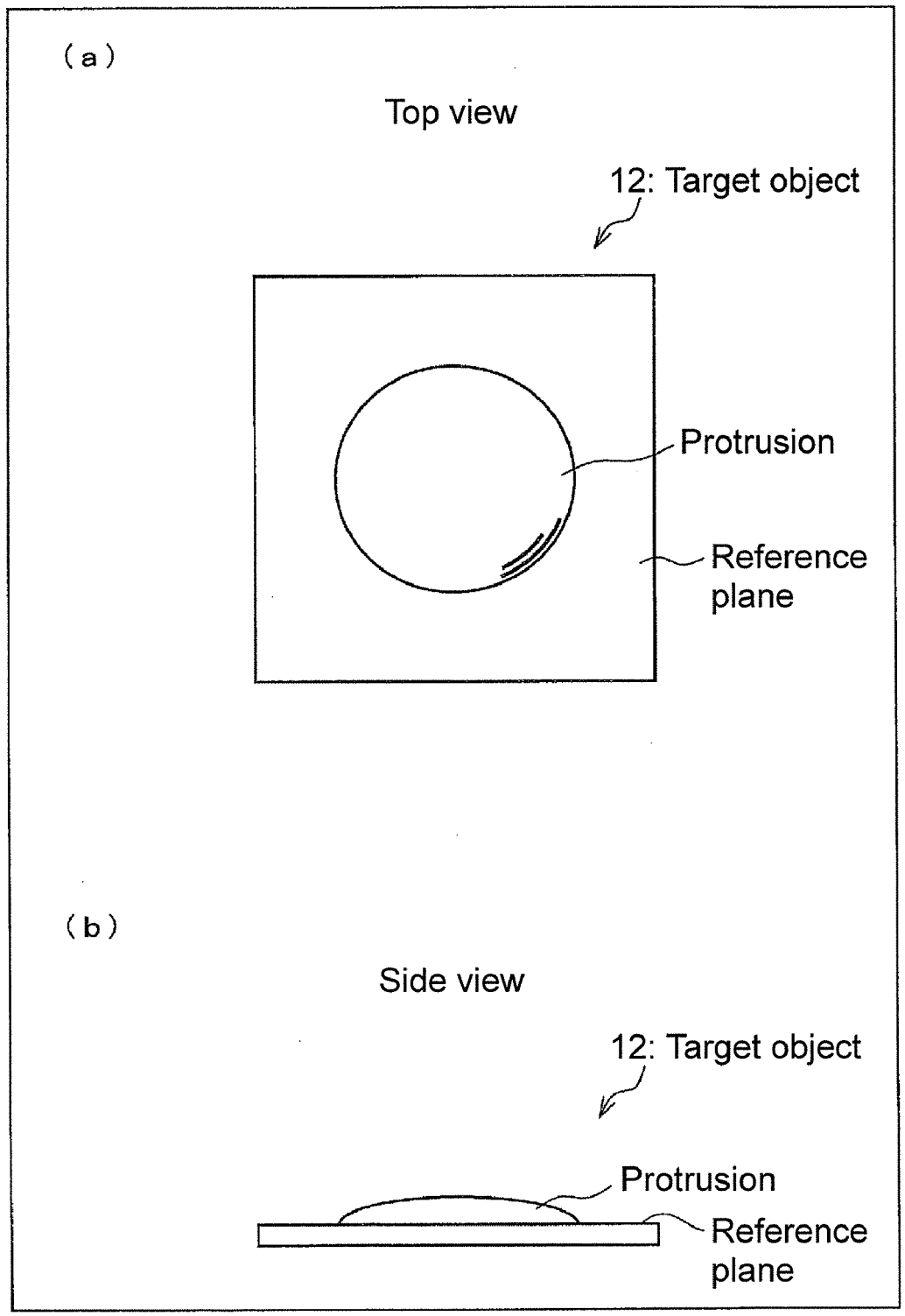
FIG. 4 is a view showing the shape of a target object measured by the three-dimensional shape measuring apparatus.
Figure 5:
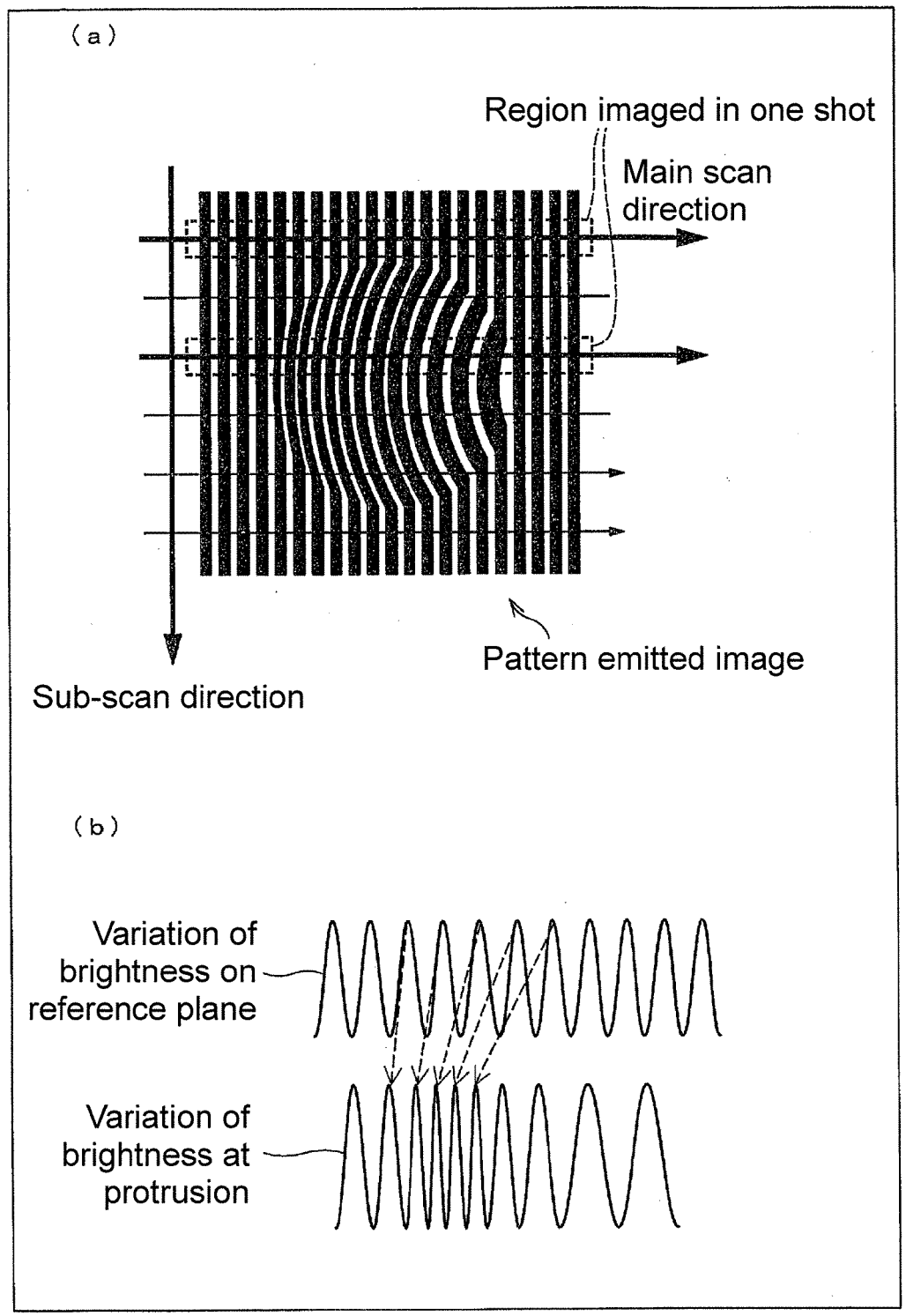
FIG. 5 is a view showing distortion of an optical pattern projected onto the target object when the optical pattern is projected onto the target object.

The optical pattern projected onto the target object 12 will be described with reference to FIG. 4 and FIG. 5. FIG. 4 is a view showing the shape of the target object 12. FIG. 4(a) is a top view, and FIG. 4(b) is a side view. FIG. 5 is a view showing distortion of the optical pattern projected onto the target object 12 when the optical pattern is projected onto the target object 12. FIG. 5(a) is a top view, and FIG. 5(b) is a waveform diagram showing variation of brightness on the reference plane and variation of brightness at a protrusion.

In the case where the optical pattern is projected onto the target object 12 shown in FIG. 4(a) and FIG. 4(b), the projected optical pattern attains the pattern shown in FIG. 5(a) when observed from above. That is, in the optical pattern projected from the oblique direction, distortion is generated in a protrusion having the height. When the imaging unit 30 scans the target object 12 onto which the optical pattern is projected in the above-described manner, the relationship between the scan position and the brightness becomes the relationship shown in FIG. 5(b).

As shown in FIG. 5(b), the brightness is always changed in a constant period in the optical pattern projected onto the reference plane where the protrusion does not exist. On the other hand, the bright period is changed by a slope of the protrusion in the optical pattern projected onto the protrusion, which results in the phase shift with respect to the optical pattern projected onto the reference plane. Therefore, when the difference is calculated between the phase of the optical pattern in the pixel at a certain position included in the image in which the optical pattern is actually projected onto the target object 12 to take the image and the phase (reference phase) of the same pixel in which the optical pattern is projected onto the reference plane, the height of the target object 12 can be determined at the position corresponding to the pixel, based on the principle of the triangulation.

In computing the phase difference, a reference phase can previously be determined by projecting the optical pattern onto the reference plane to take the image. On the other hand, there are roughly two methods of determining the phase of the optical pattern in the pixel at each position included in the image in which the optical pattern is actually projected onto the target object to take the image. The spatial fringe analysis method differs from the temporal fringe analysis method in the method of determining the phase.

As shown in FIG. 5(b), in the sine function, the same phase which gives a certain displacement exists at two points in one period. For example, in the function expressed by $y=\sin\theta$, the phase $\theta$ which gives the displacement $y=0$ exists at two points of 0 and $\pi$. The phase $\theta$ which gives the displacement $y=\frac{1}{2}$ exists at two points of $\pi/6$ and $5\pi/6$. For this reason, in the taken image, the phase of the optical pattern in the image cannot be determined from the brightness value (corresponding to the displacement of the sine function) of a single pixel.

In the conventionally-used temporal fringe analysis method, is performed by projecting the optical pattern having the shift of the predetermined amount onto the target object, imaging the target object again, and analyzing the two images to determine the one phase. In other words, two possible phases of the optical pattern at that pixel are determined based on brightness of the pixel in the image taken first, and then the one phase of the optical pattern is determined based on brightness of the pixel in the subsequently-taken image. Therefore, when the temporal fringe analysis method is used, it is understood that it is necessary to image the target object at least twice even where the reflection characteristic of the target object is strictly uniform.

On the other hand, in spatial fringe analysis, based on the brightness values of the pixel whose phase is determined (hereinafter referred to as an "attention pixel") and the neighboring pixels, the phase in the attention pixel is computed. For example, in the above example, the phase 8 which gives the displacement y=0 exists at two points of 0 and π. However, the brightness value of the neighboring pixels is different between a case where the phase of the attention pixel is 0 and a case where the phase thereof is π. For example, when the phase is 0 in the attention pixel, the brightness value of the neighboring pixels whose phase is slightly smaller than that of the attention pixel becomes smaller than the brightness value of the attention pixel. On the other hand, when the phase is π in the attention pixel, the brightness value of the neighboring pixels whose phase is slightly smaller than that of the attention pixel becomes larger than the brightness value of the attention pixel. Accordingly, the one phase can be determined as the phase of the optical pattern based on the neighboring pixels of the attention pixel. Thus, spatial fringe analysis is characterized in that the phase in the attention pixel is determined based on the brightness value of the pixels existing near the attention pixel.

The specific process of the spatial fringe analysis method used in the three-dimensional shape measuring apparatus 10 according to the present embodiment will be described below. However, the invention is not limited to the process described below, but any applicable process may be adopted as long as it is based on the principle of the above-described fringe analysis method.

In the present embodiment, a phase-shift optical pattern in which the phase is shifted by 90 degrees from the optical pattern is virtually produced from the taken line image. At this point, when the projected optical pattern is set by the following equation (2), $$I(x) = B(x)\sin(\phi(x)) \quad (2)$$

Where I(x) indicates a brightness value at a position x, B(x) indicates an arbitrary function, and ϕ(x) indicates a phase at the position x.

the phase-shift optical pattern in which the phase is shifted by 90 degrees from the optical pattern is expressed by the following equation (3).

$$\hat{I}(x) = B(x)\sin\left(\phi(x) + \frac{\pi}{2}\right) \quad (3)$$
$$= B(x)\cos(\phi(x))$$

Where $\hat{I}(x)$ indicates a brightness value at the position x by the phase-shift optical pattern.

Accordingly, in order to determine the phase ϕ(x) of the pixel at the position x, $$\phi(x) = \tan^{-1}\frac{I(x)}{\hat{I}(x)} \quad (4)$$

the above equation (4) is used.

The value of I(x) is the brightness value of the pixel at the position x in the sub-scan direction. On the other hand, the value of Î(x) (hereinafter I(x) with a hat is denoted as I^(x) for the purpose of convenience) is computed using Hilbert conversion. That is, the brightness value I^(x) at the position x by the phase-shift optical pattern is expressed by the following equation (5).

$$\hat{I}(x) = \frac{1}{\pi}\int_{-\infty}^{\infty}\frac{I(\tau)}{x-\tau}d\tau \quad (5)$$

At this point, the obtainable brightness data is data in each pixel; namely, the brightness data is the discrete data, so that the equation (5) is approximated in the form of the following equation (6).

$$\hat{I}(x) = \sum_{k=-N}^{N} h(x-k)I(k) \quad (6)$$

Where h(x) is a function expressed by $$h(x) = \frac{1}{\pi x},$$

and h(x) indicates temporal region characteristic of the Hilbert conversion.

The value of the I^(x) can be determined by the equation (6).

Therefore, when the brightness value I(x) is obtained, the value I^(x) is obtained from the above equation (6), and the phase ϕ(x) can be obtained from the above equation (4). Then, the height z at the position x can be calculated based on the above-described principle of the triangulation from the phase difference Δϕ(x) between the obtained phase ϕ(x) and the phase ϕ₀(x) on the reference plane.

Specifically, the height z is calculated as the distance from the reference plane.

$$z = f(\Delta\phi(x)) = \frac{\Delta\phi(x)}{A(x,z)\Delta\phi(x) + B(x,z)} \quad (7)$$

The height z can be obtained from the above equation (7). In the equation (7), A(x,z) and B(x,z) are functions that are determined, for each pixel, depending on the geometric arrangement such as the pattern period, the distance from the camera to the reference plane, and the pattern projection angle.

Figure 6:
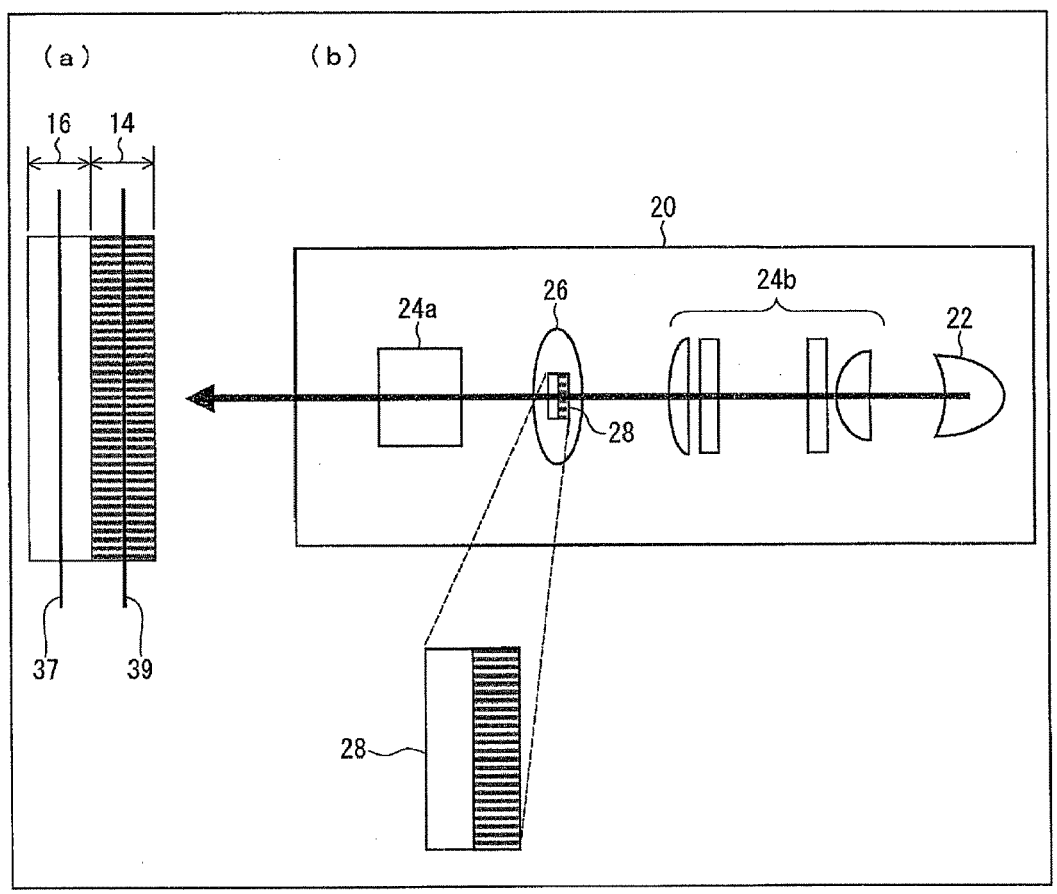
FIG. 6 is a view for explaining a projector unit 20 and the projected optical pattern.
Figure 7:
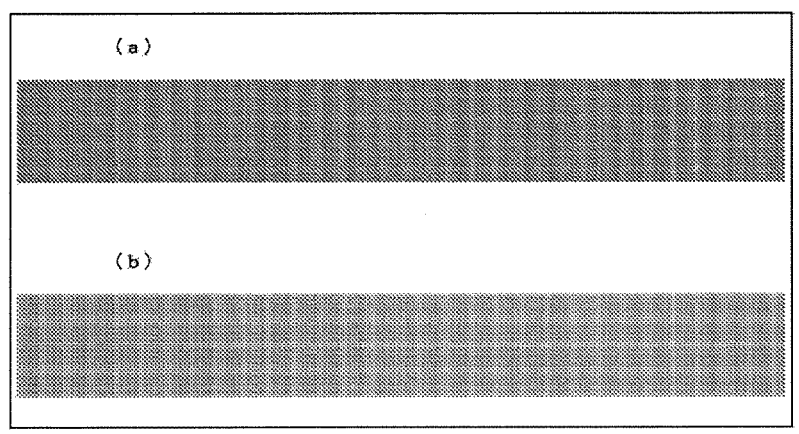
FIG. 7 shows a state where the optical pattern or a uniform illumination is emitted onto the target object.

Subsequently, the details of the projector unit 20 will be described with reference to FIG. 6. FIG. 6 is a view for explaining the projector unit 20 and the projected optical pattern. FIG. 6(*a*) is a top view of the projected optical pattern. FIG. 6(*b*) is a cross sectional view showing the structure of the light projector section of the projector unit 20. The projector unit 20 includes the light source (lamp unit) 22, a projector lens 24*a*, the pattern generator (chart) 26, a condensing lens group 24*b* including, e.g., a collimator lens, an integrator lens, and a condenser lens.

The light projected from the light source 22 passes through each lens so that the wavelength and the amount of light are adjusted, and thereafter the light is emitted to the pattern generator 26. With the emitted light, the fringe pattern formed on the pattern generator 26 is enlarged by the projector lens 24*a*. Then, the image is inversed, and the optical pattern in the form of fringe is formed on the measurement surface.

In this example, the pattern generator 26 is formed with a chart on the right half for generating the optical pattern and a transparent region on the left half for allowing uniform light to pass through. However, the present invention is not limited to this example. Alternatively, the optical separation unit 28 may be used to separate light into a light projected onto the optical pattern-emitted region 14 and a light projected onto the optical pattern-non-emitted region 16, or a uniform illumination projection unit may be arranged separately to emit, to the optical pattern-non-emitted region, a uniform illumination having the same amount of light as the projected optical pattern.

FIG. 7(a) shows an example of the optical pattern-emitted region 14 onto which the optical pattern is projected. FIG. 7(b) shows an example of the optical pattern-non-emitted region 16 onto which the optical pattern is not projected but a uniform illumination is emitted. As shown in FIG. 7(b), even when light of uniform brightness is projected onto the target object 12, it is understood that unevenness (spots) occurs in the taken image. This results from the difference in the reflective characteristics at each portion of the target object 12. As shown in FIG. 7(a), the unevenness occurs in the image in the optical pattern-emitted region 14 onto which the optical pattern is projected, and an error occurs in the phase calculated using the image in the optical pattern-emitted region 14.

Figure 8:
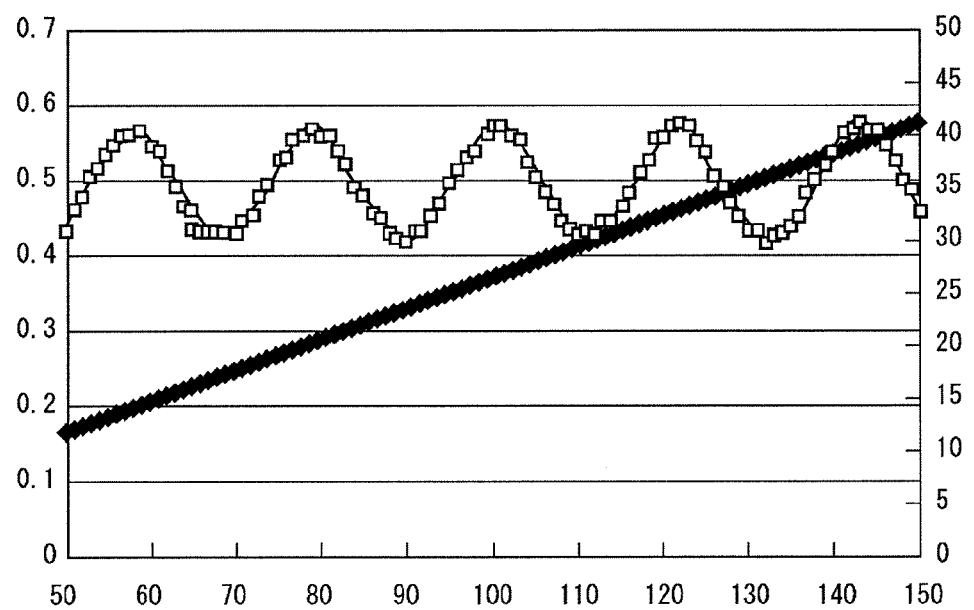
FIG. 8 is a graph relating to the three-dimensional shape measuring apparatus and showing a brightness value of a line image from which a background component is removed and a phase calculated using an image in the optical pattern-emitted region when the height of the target object is constant.

FIG. 8 shows the brightness value of the line image from which a background component is removed and the phase calculated using the image in the optical pattern-emitted region 14 when the height of the target object 12 is constant. In FIG. 8, the longitudinal axis on the left side represents the amount of signal from which the background component is removed, and the longitudinal axis of the right side represents the phase (rad). The lateral axis represents the position x of the pixel included in the image in the optical pattern-emitted region 14 in the sub-scan direction.

It is understood from FIG. 8 that the brightness value of the image in the optical pattern-emitted region 14 from which the background component is removed is represented by the same sine function as that of the optical pattern, and that the phase calculated using the image in the optical pattern-emitted region 14 has a constant increasing rate, which means that unevenness has been removed therefrom. Therefore, it is possible to reduce an error caused by the difference in the reflective characteristics at each portion of the target object 12.

Figure 9:
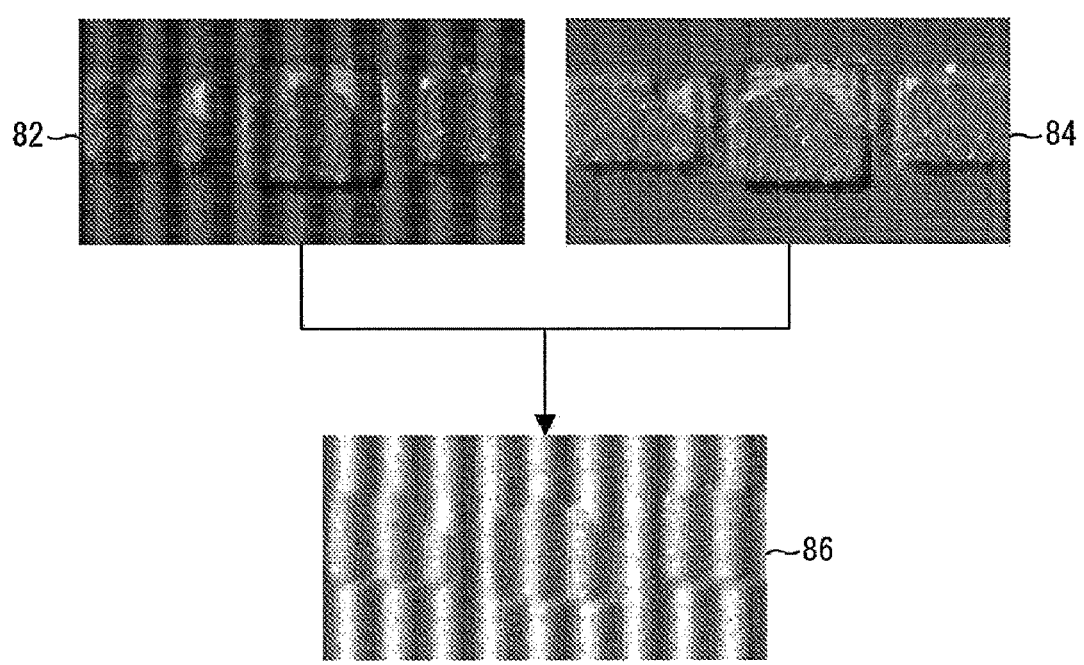
FIG. 9 is a view showing a specific example of a image generated from an image obtained by imaging the target object onto which the optical pattern is projected and an image obtained by imaging the target object onto which the optical pattern is not projected, wherein a background component is removed from the images.

FIG. 9 is a view showing a specific example of a image generated from the image obtained by imaging the target object 12 onto which the optical pattern is projected and the image obtained by imaging the target object 12 onto which the optical pattern is not projected, wherein the background component is removed from the images. An image 82 is obtained by imaging the target object 12 onto which the optical pattern is projected. An image 84 is obtained by imaging the target object 12 onto which the optical pattern is not projected. An image 86 is obtained by removing the background component from the image 82 and the image 84 and standardizing the images.

As can be seen from the image 86, the optical pattern can be read more clearly by using the image 82 and the image 84 and removing the background component. Therefore, the image analysis/drive control unit 40 can measure the height more accurately.

Figure 10:
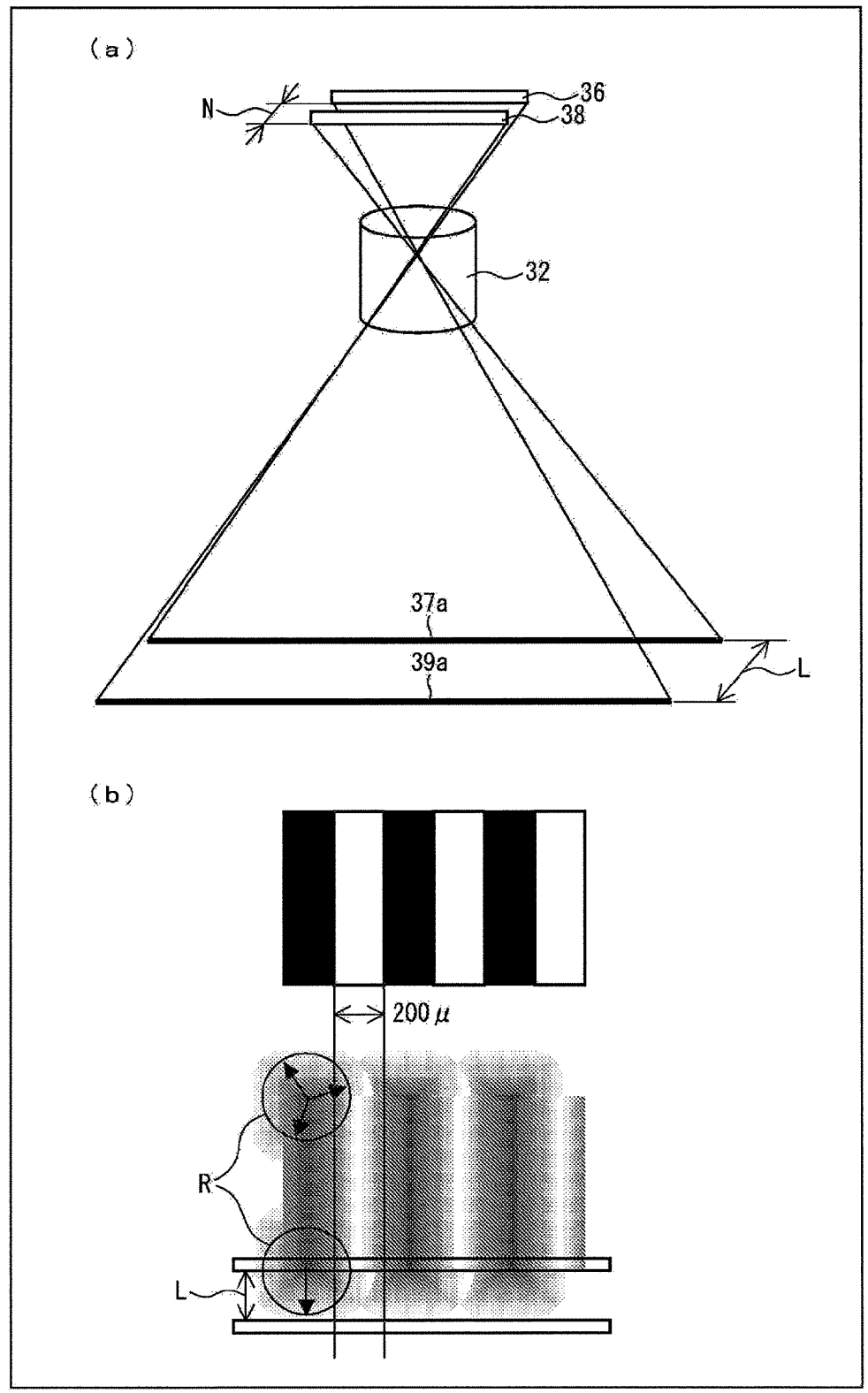
FIGS. 10A and 10B are conceptual views for illustrating relationship between fringes of the projected optical pattern and an interval between the line sensors.

FIG. 10 is a conceptual view for illustrating relationship between fringes of the projected optical pattern and the interval between the line sensors. In FIG. 10(a), the first line sensor 36 and the second line sensor 38 are arranged to face the measurement surface through the imaging lens 32. A region 37a and a region 39a are imaging regions of the line sensor 36 and the line sensor 38. At this moment, the interval between the line sensor 36 and the line sensor 38 is set to N [μm], and the interval between the region 37a and the region 39a is set to L [μm].

In FIG. 10(b), the distance between fringes of the optical pattern is 200 [μm]. However, this distance 200 [μm] is a distance measured in a case where the optical pattern is projected under ideal condition. In reality, the fringe pattern is fogged, and is spread into a region R by blur. Therefore, when the optical pattern-non-emitted region 16 is imaged by the second line sensor 38, it is necessary to set an imaging location in a region away by L from the region R into which the fringe pattern is spread by blur.

In this case, the line interval L can be obtained multiplying a resolution/cell pitch by a line sensor interval N in the sub-scan direction of the imaging unit (unit: μm).

Figure 11:
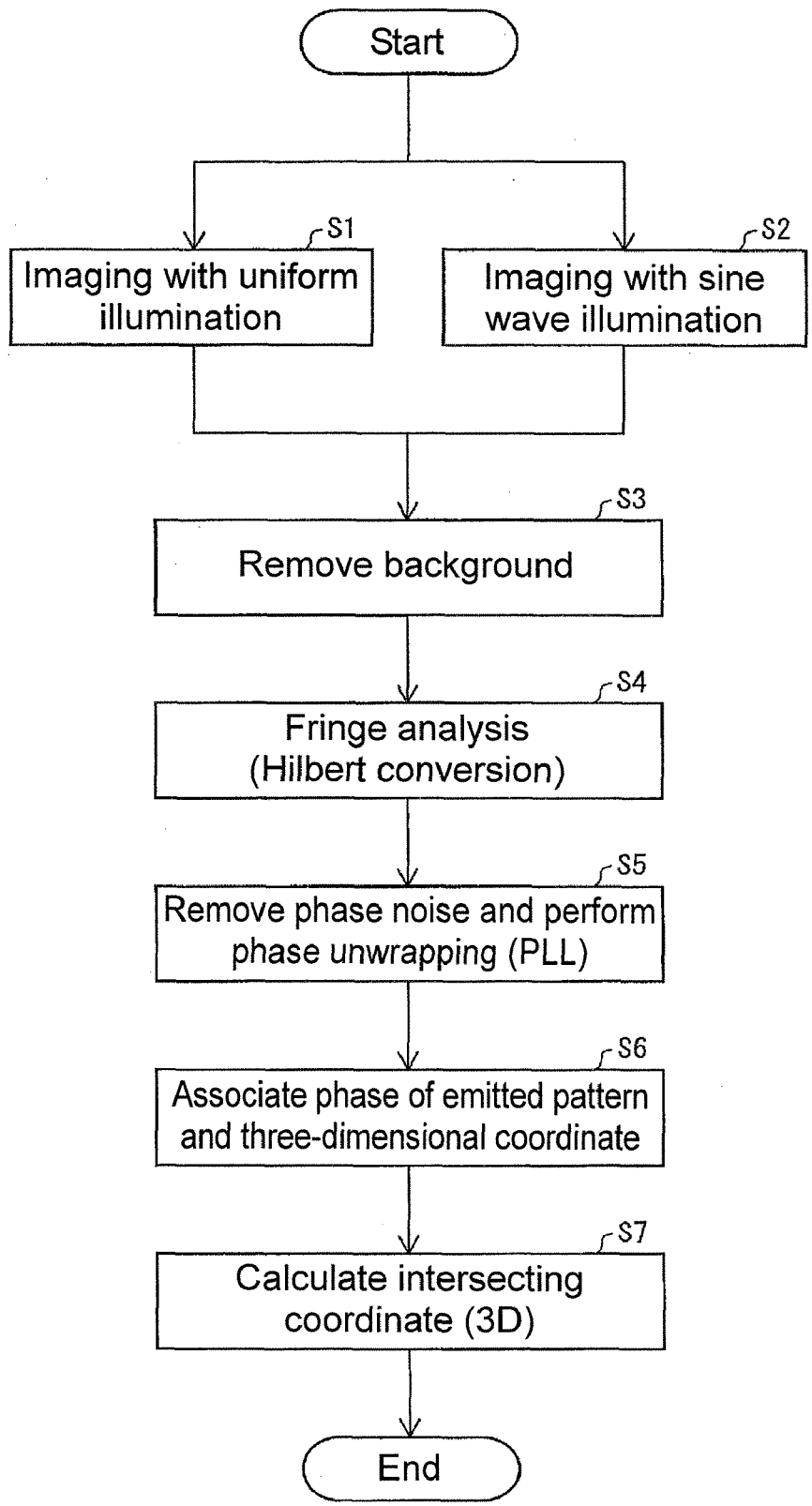
FIG. 11 is a flow diagram illustrating a procedure of process for measuring the three-dimensional shape performed on the three-dimensional shape measuring apparatus by a three-dimensional shape measuring apparatus 10.

Subsequently, actual process for actually measuring the three-dimensional shape performed by the three-dimensional shape measuring apparatus 10 according to the present embodiment will be described with reference to FIG. 11. FIG. 11 is a flow diagram illustrating the procedure of process for measuring the three-dimensional shape performed by the three-dimensional shape measuring apparatus 10.

Upon start of the measuring process, the following steps are performed: in S1, the second line sensor 38 images the optical pattern-non-emitted region 16 onto which a uniform illumination is emitted; and in S2, the first line sensor 36 images the optical pattern-emitted region 14 onto which the optical pattern is projected with a sine wave illumination. The above processes in S1 and S2 are performed at the same time, and the images taken by the line sensors are transmitted to the capture board 42 of the image analysis/drive control unit 40.

Subsequently, in S3, background information is removed from the images taken by the line sensors. More specifically, for example, the image 86 is obtained by subtracting the image 84 from the image 82 of FIG. 9. It should be noted that other normalizing methods may be used to remove background information. The processes in S1 to S3 correspond to a pre-process for performing fringe analysis on the image.

The capture board 42 processes the images taken by the line sensors in real time so as to calculate the height of the target object 12. More specifically, the height of the target object 12 is derived by performing the following processes in S4 to S7.

Subsequently, in S4, how much the phase of the optical pattern is shifted is calculated by performing fringe analysis. More specifically, as shown in the equation 5 to the equation 7, fringe analysis is performed using Hilbert conversion. Then, in S5, PLL (Phase Locked Loop) and the like are used to remove phase noise and perform phase unwrapping. The processes in S4 and S5 correspond to a process for calculating the phase from the image.

Thereafter, in S6, the phase of the projected optical pattern is associated with the three-dimensional coordinate based on parameters and a phase obtained in advance during calibration performed before measurement. In S7, an intersecting coordinate between the target object and a three-dimensional coordinate is obtained, namely, the height of the measured three-dimensional shape is obtained (distance measuring), and the measuring processing of the three-dimensional shape is terminated.

As described above, the three-dimensional shape measuring apparatus 10 according to the present embodiment measures the three-dimensional shape of the target object 12 by analyzing the optical pattern projected onto the target object 12, and the three-dimensional shape measuring apparatus 10 includes: the projector unit 20 for projecting the optical pattern onto a region of the conveyance stage 52 on which the target object 12 is measured, the optical pattern having brightness changing periodically according to a position; the first line sensor 36 for imaging the optical pattern-emitted region 14 onto which the optical pattern of the target object 12 is projected; the second line sensor 38 for imaging the optical pattern-non-emitted region 16 onto which the optical pattern of the target object 12 is not projected; and the image analysis/drive control unit 40 for calculating the phase of the optical pattern at a pixel included in the image 86 obtained by removing the background information from the image 82 taken by the first line sensor 36 and the image 84 taken by the second line sensor 38, based on a brightness value of the pixel and a neighboring pixel in the image 86, and the image analysis/drive control unit 40 calculating height information of the target object 12 based on the calculated phase, wherein the first line sensor 36 and the second line sensor 38 are arranged such that the first line sensor 36 and the second line sensor 38 can respectively image the optical pattern-emitted region 14 and the optical pattern-non-emitted region 16 at a time.

According to the above structure, the three-dimensional shape measuring apparatus 10 has the first line sensor 36 for reading the optical pattern projected onto the target object 12 as the image 82 and the second line sensor 38 for reading the image 84 of the target object 12 onto which the optical pattern is not projected. In this way, the imaging region is extended in the longitudinal direction of the line sensor by using the line sensor instead of the area sensor. Therefore, the target object 12 can be imaged at a high resolution while reducing the number of times the target object 12 is moved relatively in the sub-scan direction with respect to the line sensor. Consequently, the three-dimensional shape information is measured in a quick and precise manner.

Further, in the three-dimensional shape measuring apparatus 10 according to the present embodiment, the projector unit 20 projects the optical pattern onto a region of the conveyance stage 52 on which the target object 12 is placed. The first line sensor 36 is arranged at such position that the first line sensor 36 can image the optical pattern-emitted region 14 onto which the optical pattern is projected. The second line sensor 38 is arranged at such position that the second line sensor 38 can image the optical pattern-non-emitted region 16 onto which the optical pattern is not emitted.

Therefore, it takes less time to take the image, it is not necessary to arrange a mechanism such as a half mirror for switching between emission and non-emission of the optical pattern, it is not necessary to arrange a linear scaler in order to correctly adjust the position when imaging is performed multiple times, and it is possible to reduce the cost and achieve a faster imaging rate.

The three-dimensional shape measuring apparatus 10 according to the present embodiment has the imaging unit 30 including a plurality of line sensors, and two of the plurality of line sensors of the imaging unit 30 are used as the first line sensor 36 and the second line sensor 38. In this configuration, the three-dimensional shape measuring apparatus 10 according to the present embodiment is made using a camera including a plurality of line sensors.

The three-dimensional shape measuring apparatus 10 according to the present embodiment has the optical separation unit 28 that allows passage of light for forming the optical pattern projected onto the optical pattern-emitted region 14 and allows passage of the uniform illumination emitted onto the optical pattern-non-emitted region 16.

According to this configuration, the same light source as the light source emitting light onto the pattern generator 26 is used, and the light is separated by allowing passage of or shielding the light for the optical pattern-emitted region 14 and the light for the optical pattern-non-emitted region 16, so that the light quantity on the optical pattern-emitted region 14 is kept the same as the light quantity on the optical pattern-non-emitted region 16, and a higher precision is achieved in calculating the image from which the background information is removed.

In the present embodiment, the optical separation unit 28 is used to make the light quantity on the optical pattern-emitted region 14 be the same as the light quantity on the optical pattern-non-emitted region 16. Alternatively, a pattern generator such as a chart for forming the optical pattern onto the measurement surface may be used to form the optical pattern-emitted region and the optical pattern-non-emitted region so as to make the light quantity on the optical pattern-emitted region be the same as the light quantity on the optical pattern-non-emitted region.

The three-dimensional shape measuring method according to the present embodiment is the three-dimensional shape measuring method for the three-dimensional shape measuring apparatus 10 that measures the three-dimensional shape of the target object 12 by analyzing the optical pattern projected onto the target object 12, and the three-dimensional shape measuring apparatus 10 includes the projector unit 20, the first line sensor 36, and the second line sensor 38, wherein the first line sensor 36 and the second line sensor 38 arranged such that the first line sensor 36 and the second line sensor 38 can respectively image, at a time, the optical pattern-emitted region 14 onto which the optical pattern of the target object 12 is projected and the optical pattern-non-emitted region 16 onto which the optical pattern of the target object 12 is not projected, and wherein the three-dimensional shape measuring method includes: an optical pattern projecting step for projecting the optical pattern onto a region of the conveyance stage 52 on which the target object 12 is placed, the optical pattern having brightness changing periodically according to a position; an imaging step for imaging the optical pattern-emitted region 14 and imaging the optical pattern-non-emitted region 16; and a calculating step for calculating the phase of the optical pattern at a pixel included in the image 86 obtained by removing the background information from the image 82 taken by the first line sensor 36 and the image 84 taken by the second line sensor 38, based on a brightness value of the pixel and a neighboring pixel in the image 86, and for calculating height information of the target object 12 based on the calculated phase.

The above three-dimensional shape measuring method can be executed on a computer under controls of the computer.

Second Embodiment

Subsequently, another embodiment of the present invention will be hereinafter described with reference to FIG. 12 and FIG. 13. The three-dimensional shape measuring apparatus 10 according to the present embodiment is different from the three-dimensional shape measuring apparatus 10 shown in FIG. 1 in the configuration of the line camera of the imaging unit 30, but the other structures are the same. The elements having the same functions as the elements described in the above embodiment are denoted with the same reference numerals, and the description thereabout is omitted.

Figure 12:
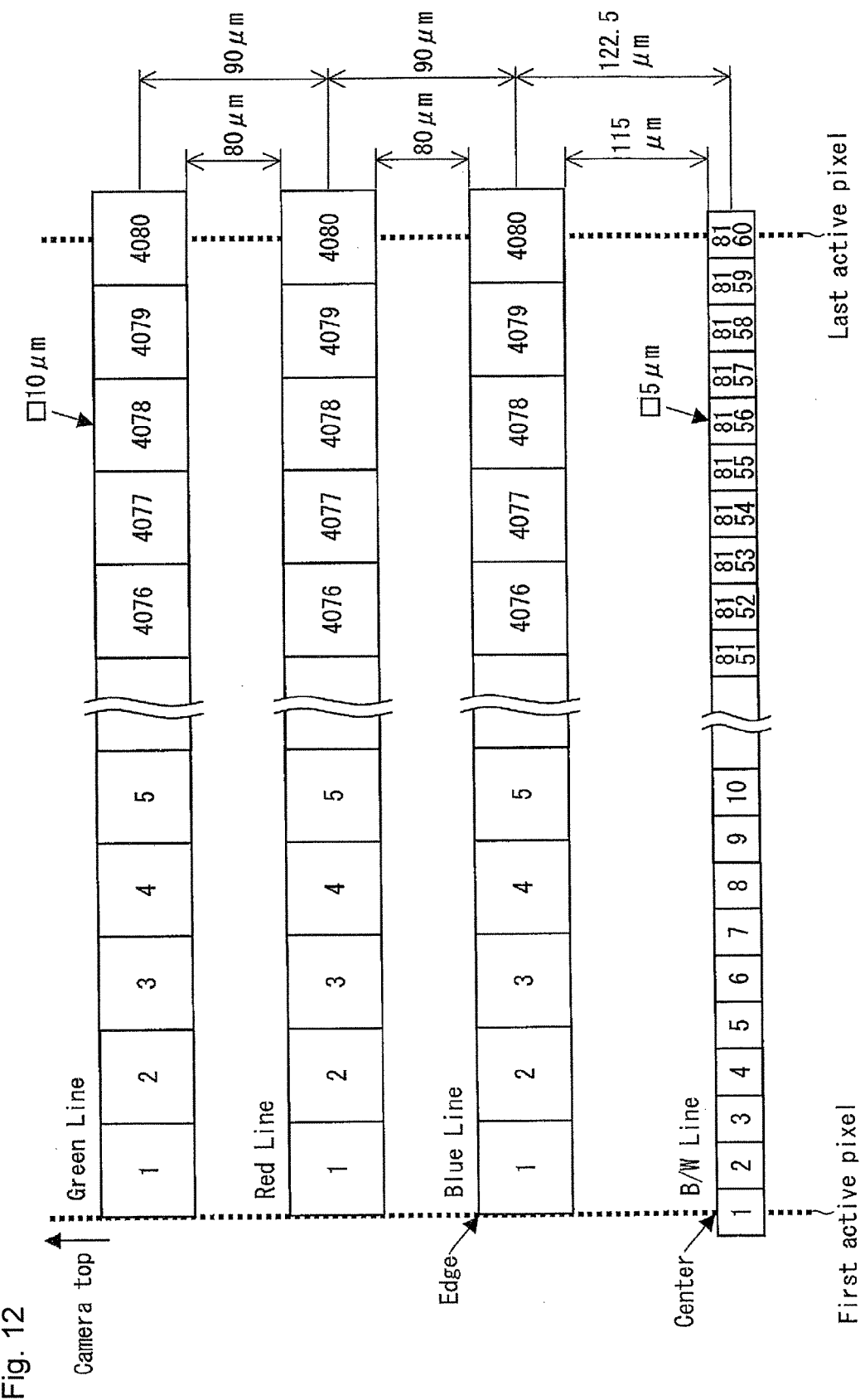
FIG. 12 shows another embodiment and is a diagram illustrating the arrangement of line sensors arranged on a color imaging camera used in the three-dimensional shape measuring apparatus, wherein the line sensors detect brightness of colors of red, green, blue, black and white.

FIG. 12 is a view for illustrating the arrangement of line sensors arranged on a color imaging camera (color imaging means) used in the three-dimensional shape measuring apparatus 10 according to the present embodiment. The line sensors detect brightness of colors of red, green, blue, black and white. In FIG. 12, KLI-4104 (CSL8000CL) made by Kodak Company is shown as an example of a color sensor including a plurality of CCDs (Charge Coupled Device) serving as line sensors.

In FIG. 12, Green Line represents a CCD for detecting brightness of green color, Red Line represents a CCD for detecting brightness of red color, Blue Line represents a CCD for detecting brightness of blue color, and B/W Line represents a CCD for detecting brightness of black and white. The upper side of FIG. 12 represents the main scan direction of the color imaging camera, and the broken line on the left end represents first effective pixel. The broken line on the right end represents last effective pixel. The imaging device for detecting brightness of black and white is allocated in the optical center of the first effective pixel.

Rectangles shown as lines of green, red, and blue represent the first, second, . . . , 4080th imaging devices, and one rectangle represents an area of an imaging device of 10 μm. Rectangles shown as lines of black and white represent the first, second, . . . , 8060th imaging devices, and one rectangle represents an area of an imaging device of 5 μm. In this way, the imaging device for black and white has a precision twice as much as the imaging devices for green, red, and blue.

The interval between green and red lines and the interval between red and blue lines are 80 μm, and the distance from the optical center of each line is 90 μm. The interval between blue and black/white lines is 115 μm, and the distance from the optical center of each line is 122.5 μm.

In the present embodiment, the detection result of the line sensor for detecting black and white is adopted as the first line sensor brightness information. The detection result of the line sensor for detecting red, blue, and green is converted into brightness and adopted as the second line sensor brightness information.

Figure 13:
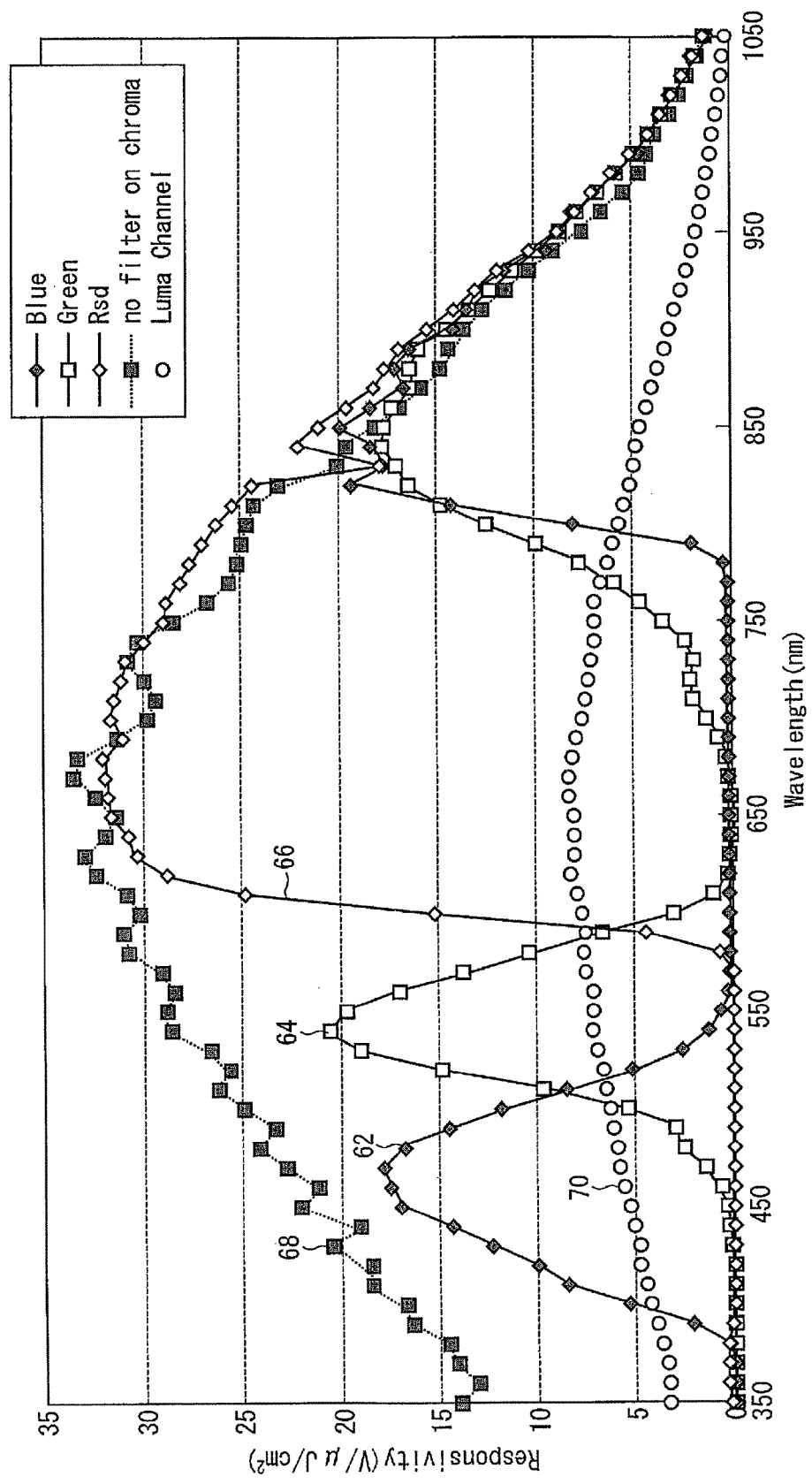
FIG. 13 is a graph of the result obtained by measuring brightness of each color using the three-dimensional shape measuring apparatus.

FIG. 13 is a view showing a graph of the result obtained by measuring brightness of each color using the line sensors having CCDs for red, blue, green, black and white as described above. In the graph of FIG. 13, the lateral axis represents wavelength [μm], and the longitudinal axis represents sensitivity characteristic [V/μJ/cm$^2$] with respect to each color. In the present embodiment, RGB is converted into Y (brightness), so that sensitivity characteristics of red, green, and blue are matched with sensitivity characteristic of black/white.

In the graph of FIG. 13, a line 62 represents sensitivity characteristic of blue, a line 64 represents sensitivity characteristic of green, a line 66 represents sensitivity characteristic of red, and a line 68 represents sensitivity characteristic without filters for red, blue, and green. A line 70 represents sensitivity characteristic of black and white.

As described above, sensitivity characteristics similar to the black/white sensitivity characteristic 70 are made by multiplying the blue sensitivity characteristic 62, the green sensitivity characteristic 64, and the red sensitivity characteristic 66 by a coefficient and adding them. Accordingly, whichever of red, blue, green, black and white sensors is used, the used sensor can be used as the first line sensor 36 or the second line sensor 38.

As described above, the detection results provided by the three line sensors, i.e., red, green and blue, are converted and used as the image without the optical pattern, and the detection result provided by the black/white line sensor is used as the image with the optical pattern. Therefore, the detection can be performed just as well as the case where two line sensors having the same sensitivity are used.

In the above example, the detections of brightness of R, G, and B are converted into brightness of W/B. Alternatively, a filer for any one of the colors of R, G, and B, for example, a filer for G may be given to the line sensor for detecting the color of W/B, and the detection results may be obtained from this line sensor and the original G line sensor.

Third Embodiment

Figure 14:
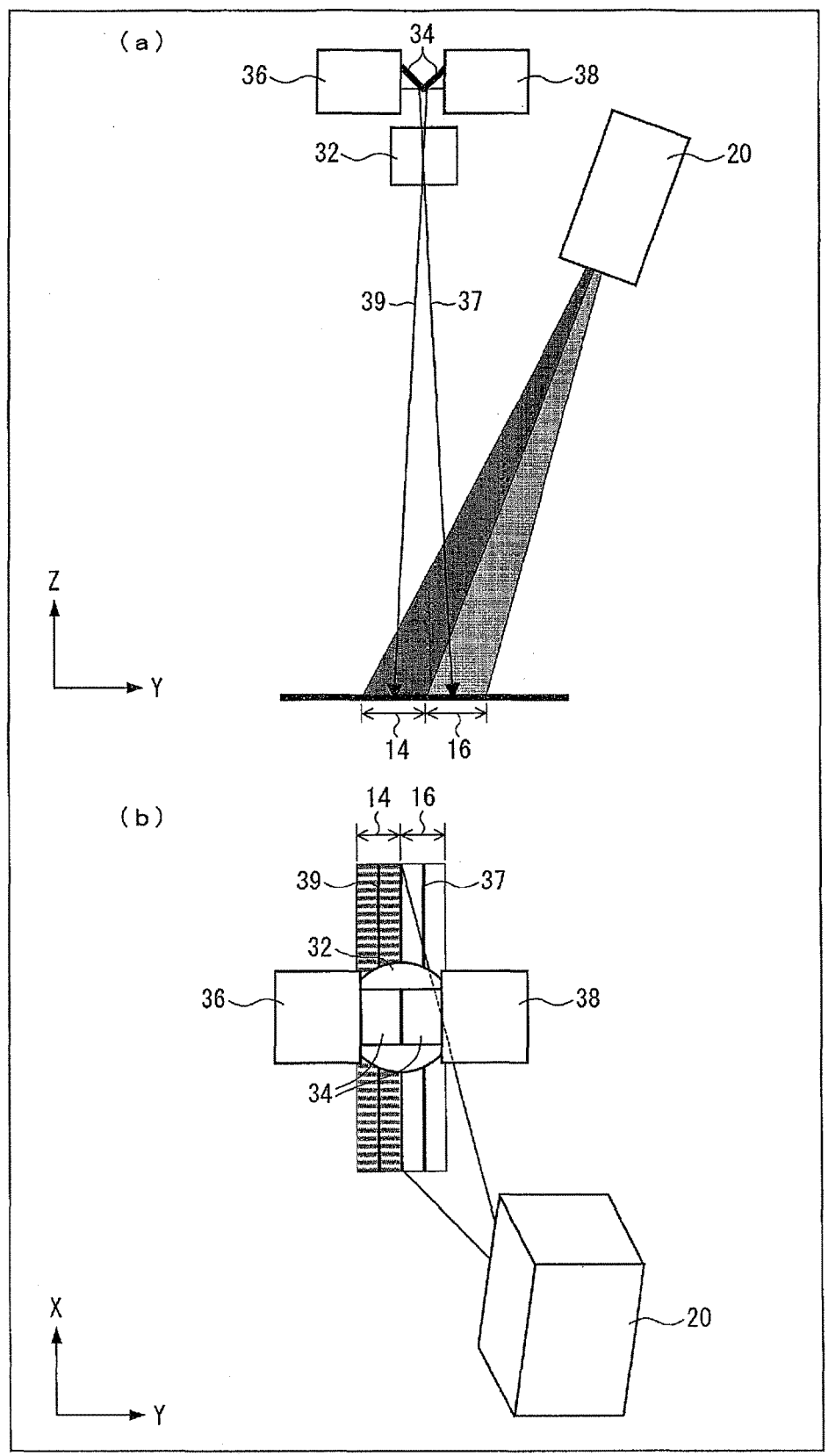
FIGS. 14 (a)-(b) show still another embodiment and is a cross sectional view and a top view showing a configuration of an essential portion of a three-dimensional shape measuring apparatus.

Subsequently, still another embodiment of the present invention will be hereinafter described with reference to FIG. 14. FIG. 14 is a view showing a schematic structure of the three-dimensional shape measuring apparatus 10 according to the present embodiment. The elements having the same functions as the elements described in the above embodiments are denoted with the same reference numerals, and the description thereabout is omitted.

The three-dimensional shape measuring apparatus 10 of FIG. 14 is different from the above-described embodiments in that the first line sensor 36 and the second line sensor 38 are respectively arranged on cameras each having a single line sensor and that mirrors 34 are arranged so as to direct the optical axes of the line sensors of the cameras toward the measurement surface, but the other structures are the same.

In FIG. 14, a first camera having the first line sensor 36 and a second camera having the second line sensor 38 are arranged to face each other in a horizontal direction with respect to the target object surface, and the inclined mirrors 34 are arranged between the cameras, so that the optical axes of the first line sensor 36 and the second line sensor 38 are respectively directed to the optical pattern-emitted region 14 and the optical pattern-non-emitted region 16 on the target object surface.

As described above, with the mirrors arranged between the first camera and the second camera, the optical axes of the first line sensor 36 and the second line sensor 38 can be easily controlled. Therefore, each line sensor can be easily arranged regardless of physical restrictions such as the shape and the size of the first and second cameras.

As described above, the three-dimensional shape measuring apparatus 10 according to the present embodiment includes the first camera having the first line sensor 36, the second camera having the second line sensor 38, the first mirror arranged so as to direct the optical axis of the first line sensor 36 toward the optical pattern-emitted region 14, and the second mirror arranged so as to direct the optical axis of the second line sensor 38 toward the optical pattern-non-emitted region 16.

The first line sensor 36 and the second line sensor 38 image the optical pattern-emitted region 14 and the optical pattern-non-emitted region 16 through the identical imaging lens 32.

According to the above configuration, the combination of the plurality of cameras each having the single line sensor and the plurality of mirrors 34 enables easy control of the optical axes of the line sensors 36 and 38 and enables making the three-dimensional shape measuring apparatus 10 using the plurality of cameras.

Since the images are taken through the same imaging lens 32, elements including the camera can be formed small when the arrangements of the first camera and the second camera are determined, and the optical axes can be set using the mirrors 34, which is especially a significant effect.

Fourth Embodiment

In the above embodiments, the three-dimensional shape measuring apparatus 10 has the one projector unit 20 and the one imaging unit 30. However, the combination of the projector unit 20 and the imaging unit 30 is not limited to the above example. For example, a plurality of combinations may be used as shown in FIG. 15(a) to FIG. 15(e).

Figure 15:
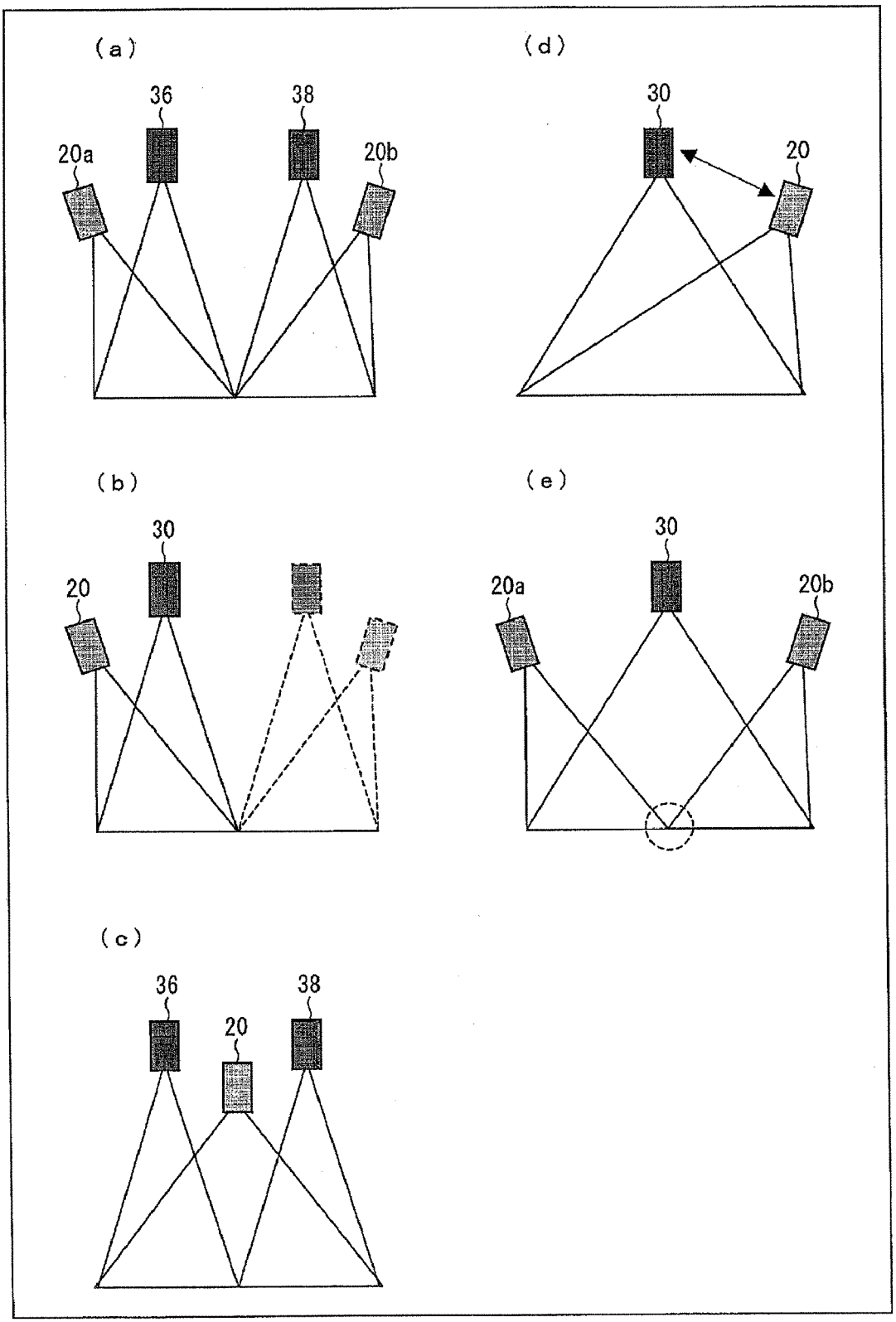
FIGS. 15 (a)-(e) show yet another embodiment and is a side view of various configurations of the three-dimensional shape measuring apparatus.

FIG. 15 is a schematic diagram showing the structure of the three-dimensional shape measuring apparatus 10 including a combination of the imaging unit 30 and a plurality of projector units 20 for widening the visual field.

FIG. 15(a) shows an example of the three-dimensional shape measuring apparatus 10 that is made using two line sensors 36 and 38 and two projector units 20a and 20b. FIG. 15(b) shows an example of the three-dimensional shape measuring apparatus 10 in which one line sensor and one projector unit are omitted from the configuration of FIG. 15(a). In this case, it is necessary to add an X stage for moving the conveyance stage 52 in the sub-scan direction, but the cost can be reduced because the configuration of the apparatus is simpler.

FIG. 15(c) shows an example of the three-dimensional shape measuring apparatus 10 that is made using two line sensors and one projector unit 20. In this case, the projector lens 24 of the projector unit 20 needs to be wide-angle. Therefore, the aberration correction becomes more difficult, and it becomes more difficult to achieve the precision since the optical axes are not converged. As a result, it is necessary to reconsider the precision.

FIG. 15(d) shows an example of the three-dimensional shape measuring apparatus 10 that is made using one imaging unit 30 and one projector unit 20. In this case, the measured substrate having the size of 250 mm by 330 mm, i.e., a so-called M-size substrate, is assumed to be scanned. Accordingly, the three-dimensional shape measuring apparatus 10 can be made of one camera and one projector when the resolution is made larger. The imaging device of the imaging unit 30 needs to have many pixels. More specifically, for example, the imaging device needs to have a high precision in which longitudinal and lateral lengths of XY have 12500 [pixels] with 20 [μm] so as to obtain approximately 20 μm×12500=250 mm, which results in a large range which is imaged and onto which light is projected. Therefore, the projector lens 24 and the imaging lens 32 need to be wide-angle. When both of the lenses are made wide-angle, the distance to the measurement surface becomes larger, which may result in reducing the rigidity of the three-dimensional shape measuring apparatus 10.

FIG. 15(e) shows an example of the three-dimensional shape measuring apparatus 10 that is made using one imaging unit 30 and two projector units 20a and 20b. In this case, an incompatibility may occur at a joining section (a section indicated by broken-line circle) of the optical pattern projected by the projector units 20a and 20b.

The invention is not limited to the above embodiments, but various changes could be made without departing from claims of the invention. That is, the technical range of the invention shall include embodiments obtained by appropriately combining technical means disclosed in different embodiments.

In the example of the present embodiment, the light source 31 and the projector lens are used to project the optical pattern, but the present invention is not limited thereto. A kind of a projector may be used to project a fringe pattern, and the present invention may be applied to a diffraction grating.

Each functional block of the three-dimensional shape measuring apparatus 10, especially, the image analysis/drive control unit 40, can be implemented by hardware logic. Alternatively, the functional blocks may be implemented by software using a CPU as follows.

That is, the three-dimensional shape measuring apparatus 1 includes a CPU (Central Processing Unit) which executes the control program command for realizing each function, a ROM (Read Only Memory) in which the program is stored, a RAM (Random Access Memory) which expands the program, and a storage device (recording medium) such as a memory in which the program and various kinds of data are stored. The purpose of one or more embodiments of the present invention can be achieved by supplying a computer-readable recording medium storing program codes (executable format program, intermediate code program, and source program) of the control program of the three-dimensional shape measuring apparatus 10, i.e., software for achieving the above functions, to the three-dimensional shape measuring apparatus 10 to cause the computer (or CPU or MPU) to read and execute the program codes recorded in the recording medium.

Examples of the usable recording medium include a tape system such as magnetic tape and cassette tape, a disc system including magnetic discs such as a floppy (registered trademark) disk and a hard disk and optical discs such as CD-ROM, MO, MD, DVD, and CD-R, a card system such as an IC card (including a memory card) and an optical card, and a semiconductor memory system such as a mask ROM, an EPROM, an EEPROM, and a flash ROM.

The three-dimensional shape measuring apparatus 10 may be connected to a communication network to supply the program codes through the communication network. There is no particular limitation on the communication network. Examples of the usable communication networks include the Internet, an intranet, an extranet, LAN, ISDN, VAN, a CATV communication network, a virtual private network, a public telephone line, a mobile communication network, and satellite communication network. There is no particular limitation on the transmission medium constituting the communication network. Examples of the transmission media include wired transmission media such as IEEE 1394, USB, a power-line communication, a cable TV line, a telephone line, and an ADSL line and wireless transmission media including infrared ray such as IrDA and a remote-controller, Bluetooth (registered trademark), 802.11 wireless, HDR, a portable telephone network, a satellite communication line, a digital terrestrial network. One or more embodiments of the present invention can also be implemented as a computer data signal embedded in a carrier wave, in which the program codes are realized as electronic transmission.

Therefore, the three-dimensional shape measuring apparatus according to one or more embodiments of the present invention uses the spatial fringe analysis method. In the spatial fringe analysis method, the phase of the optical pattern in a pixel included in an image read by the line sensor is calculated based on a brightness value of the pixel and a neighboring pixel in the image, and height information of the target object is calculated based on the calculated phase.

Specifically, one or more embodiments of the present invention provides a three-dimensional shape measuring apparatus for measuring a three-dimensional shape of a target object by analyzing an optical pattern projected onto the target object, the three-dimensional shape measuring apparatus including: optical pattern projecting means that projects the optical pattern onto a portion of a measurement surface on which the target object is placed, the optical pattern having brightness changing periodically according to a position; a first line sensor that images an optical pattern-emitted region onto which the optical pattern of the target object is projected; a second line sensor that images an optical pattern-non-emitted region onto which the optical pattern of the target object is not projected; and processing means that calculates a phase of the optical pattern at a pixel included in an image obtained by removing background information from images taken by the first and second line sensors based on a brightness value of the pixel and a neighboring pixel in the image, and calculates height information of the target object based on the calculated phase, wherein the first and second line sensors are arranged at such positions that the first and second line sensors can respectively image the optical pattern-emitted region and the optical pattern-non-emitted region at a time.

According to the above configuration, the three-dimensional shape measuring apparatus is arranged with a first line sensor for reading the optical pattern projected onto the target object as an image and a second line sensor for reading an image of the target object onto which the optical pattern is not projected. In this way, the imaging region can be extended in the longitudinal direction (the sub-scan direction) of the line sensor by using the line sensor instead of the area sensor. Therefore, the target object can be imaged at a high resolution while reducing the number of times the target object is moved relatively in the sub-scan direction with respect to the line sensor (preferably, the number of times the target object is moved is reduced to zero), which enables measuring the three-dimensional shape information in a swift and precise manner.

The three-dimensional shape measuring apparatus calculates the shape information of the target object by analyzing the optical pattern projected onto the target object. The brightness of this optical pattern is periodically changed according to a position, and the height of the target object at a certain position can be calculated based on how much the phase of the optical pattern projected onto the position of the target object is shifted from a reference phase.

The phase of the optical pattern projected onto each section of the target object is calculated from a brightness value of an image taken by the line sensor. More specifically, based on the brightness value of a pixel (hereinafter referred to as an "attention pixel") corresponding to a certain position of the target object onto which the optical pattern is projected, the phase corresponding to the brightness value is calculated. However, when the position (i.e., phase) and the brightness value (i.e., displacement) of the optical pattern are represented by a continuous function having periodicity, a phase giving a certain brightness value (displacement) at one point exists at least at two points in the same period. For example, in the function expressed by $y=\sin\theta$, the phase $\theta$ which gives the displacement $y=0$ exists at two points of 0 and $\pi$. For this reason, the phase corresponding to the brightness value cannot be uniquely determined only from the brightness value (displacement) of the attention pixel.

At this occasion, in the conventional technique, the temporal fringe analysis method is used to determine the phase of the attention pixel. That is, two possible phases of the optical pattern corresponding to the brightness value are determined based on the brightness value of the attention pixel, and further the one phase of the optical pattern at the attention pixel is uniquely determined based on the brightness value of the corresponding pixel in another image taken with a shift in the phase of the optical pattern. Therefore, even where the reflection characteristic of the target object is strictly uniform, it is necessary to take at least two images showing the same section of the target object, and totally, two scans or more are required on the same section of the target object.

In contrast, the three-dimensional shape measuring apparatus according to one or more embodiments of the present invention includes an image analyzing unit that calculates the phase of the optical pattern at a pixel included in an image read by the line sensor, based on a brightness value of the pixel and a neighboring pixel. That is, the phase of the optical pattern at the attention pixel is roughly identified based on the brightness value of the pixel, and the phase of the optical pattern at the pixel is uniquely identified based on the brightness value of the pixel around the attention pixel.

This principle will be described. In a continuous function having periodicity, a phase giving a certain displacement exists at least at two points in the same period, but displacements in proximity to the two phases are different from each other. For example, in the above example, the phase $\theta$ which gives the displacement $y=0$ exists at two points of 0 and $\pi$. However, the brightness value (displacement) of the neighboring pixels is different between a case where the phase of the attention pixel is 0 and a case where the phase thereof is $\pi$. For example, when the phase is 0 in the attention pixel, the brightness value of the neighboring pixels whose phase is slightly smaller than that of the attention pixel becomes smaller than the brightness value of the attention pixel. On the other hand, when the phase is $\pi$ in the attention pixel, the brightness value of the neighboring pixels whose phase is slightly smaller than that of the attention pixel becomes larger than the brightness value of the attention pixel. Accordingly, the one phase can be uniquely determined as the phase of the optical pattern based on the brightness values of the neighboring pixels of the attention pixel.

In the three-dimensional shape measuring apparatus according to one or more embodiments of the present invention, the optical pattern projecting means projects the optical pattern onto a region of the measurement surface on which the target object is placed. The first line sensor is arranged at a position such that the first line sensor images the optical pattern-emitted region onto which the optical pattern is projected. The second line sensor is arranged at a position such that the second line sensor images the optical pattern-non-emitted region onto which the optical pattern is not projected.

In order to improve the measurement precision, a method may be considered that includes the steps of taking an image onto which the optical pattern is projected, taking an image onto which the optical pattern is not projected, and comparing the images so as to remove background information. In this case, if a single line sensor takes an image, the line sensor needs to take the image multiple times in order to take the image onto which the optical pattern is projected and take the image onto which the optical pattern is not projected.

Therefore, it is necessary to perform precise positioning using such as a linear scaler in order to correctly adjust the imaging position when imaging is performed multiple times. Furthermore, it is necessary to arrange an image memory for temporarily storing images taken in each of multiple shots until the images required for calculation are obtained. Still furthermore, it is necessary to arrange elements such as a foldable mirror and a half mirror for switching between projection and non-projection of the optical pattern (FIG. 16).

However, in the three-dimensional shape measuring apparatus according to one or more embodiments of the present invention, the optical pattern-emitted region and the optical pattern-non-emitted region are arranged so as not to overlap with each other, and the first line sensor and the second line sensor are arranged so that the first line sensor and the second line sensor can image the above regions at a time. In the above configuration, it is not necessary to image the entire measurement region by moving the target object multiple times during calculation of an image obtained by removing background information from the image taken by the first and second line sensors. Therefore, the three-dimensional shape measuring apparatus according to one or more embodiments of the present invention achieves the effect of being able to take the required image with only one shot.

Therefore, it takes less time to take the image, it is not necessary to arrange a mechanism such as a half mirror for switching between emission and non-emission of the optical pattern, it is not necessary to arrange a linear scaler in order to correctly adjust the position when imaging is performed multiple times, and it is possible to reduce the cost and achieve a faster imaging rate.

The above three-dimensional shape measuring apparatus has imaging means that includes a plurality of line sensors, wherein two of the plurality of line sensors of the imaging means are preferably used as the first line sensor and the second line sensor.

In the three-dimensional shape measuring apparatus, the detection results provided by the three line sensors for red, green, and blue may be converted and used as the image without the optical pattern, and the detection result of the line sensor for W/B may be used as the image with the optical pattern.

The three-dimensional shape measuring apparatus has color imaging means that includes a line sensor for detecting brightness of colors of red, green, blue, black and white, wherein a sensor including the line sensor for black and white and a filter for any one of the colors of red, green, and blue may be used as the first line sensor, and a line sensor for one of the colors of red, green, and blue that is the same color as the color of the filter may be used as the second line sensor.

According to the above configuration, the camera including the plurality of line sensors and the color camera including the line sensor for detecting the brightness value of colors of R, G, B, and W/B can be used to constitute the three-dimensional shape measuring apparatus according to one or more embodiments of the present invention.

Alternatively, a filer for any one of the colors of red, green, and blue, for example, a filer for green may be given to the line sensor for detecting the color of black and white, and the detection results may be obtained from this line sensor and the original green line sensor. According to the above configuration, the detection can be performed just as well as the case where two line sensors having the same sensitivity are used.

Further, since a color image can be obtained at the same time, two-dimensional inspection can be performed at the same time.

Further, the three-dimensional shape measuring apparatus may include: first imaging means that has a first line sensor; second imaging means that has a second line sensor; a first mirror that is arranged such that a visual axis of the first line sensor faces the optical pattern-emitted region; and a second mirror that is arranged such that a visual axis of the second line sensor faces the optical pattern-non-emitted region.

According to the above configuration, the combination of the plurality of cameras each having the single line sensor and the plurality of mirrors enables easy control of the optical axes of the line sensors and enables making the three-dimensional shape measuring apparatus using the plurality of cameras.

The first line sensor and the second line sensor may image the optical pattern-emitted region and the optical pattern-non-emitted region through an identical lens.

According to the above configuration, since the images are taken through the identical lens, elements including the imaging means can be formed small when the arrangements of the first imaging means and the second imaging means are determined, and the optical axes can be set using the mirrors, which is especially a significant effect.

The three-dimensional shape measuring apparatus may be arranged with a pattern generator that includes a transparent section and a shielding section for forming the optical pattern on the optical pattern-emitted region and emitting a uniform illumination on the optical pattern-non-emitted region.

The above three-dimensional shape measuring apparatus may be further arranged with uniform illumination projecting means that projects onto the optical pattern-non-emitted region a uniform illumination having the same amount of light as that of the optical pattern projected by the optical pattern projecting means.

According to the above configuration, the pattern generator for forming the optical pattern onto the measurement surface is used to form the optical pattern-emitted region and the optical pattern-non-emitted region and emit the uniform illumination having the same amount of light as that of the optical pattern. Therefore, the amount of light on the optical pattern-emitted region can be made the same as the amount of light on the optical pattern-non-emitted region, and the precision can be improved in calculating the image from which background information is removed.

One or more embodiments of the present invention provides a three-dimensional shape measuring method for a three-dimensional shape measuring apparatus that measures a three-dimensional shape of a target object by analyzing an optical pattern projected onto the target object, wherein the three-dimensional shape measuring apparatus includes optical pattern projecting means, a first line sensor, and a second line sensor, and wherein the first and second line sensors are arranged at such positions that the first and second line sensors can respectively image, at a time, an optical pattern-emitted region onto which the optical pattern of the target object is projected and an optical pattern-non-emitted region onto which the optical pattern of the target object is not projected, the three-dimensional shape measuring method including: an optical pattern projecting step in which the optical pattern projecting means projects the optical pattern onto a portion of a measurement surface on which the target object is placed, the optical pattern having brightness changing periodically according to a position; an imaging step in which the first line sensor images the optical pattern-emitted region, and the second line sensor images the optical pattern-non-emitted region; and a calculation step including: calculating a phase of the optical pattern at a pixel included in an image obtained by removing background information from images taken by the first and second line sensors, based on a brightness value of the pixel and a neighboring pixel in the image; and calculating height information of the target object based on the calculated phase.

According to the above configuration, the three-dimensional shape measuring method can provide that achieves the same effect as the above-described three-dimensional shape measuring apparatus.

The above calculation step in the three-dimensional shape measuring method can be executed on a computer.

One or more embodiments of the present invention provides a three-dimensional shape measuring apparatus for measuring a three-dimensional shape of a target object by analyzing an optical pattern projected onto the target object, the three-dimensional shape measuring apparatus including: optical pattern projecting means that projects the optical pattern onto a portion of a measurement surface on which the target object is placed, the optical pattern having brightness changing periodically according to a position; a first line sensor that images an optical pattern-emitted region onto which the optical pattern of the target object is projected; a second line sensor that images an optical pattern-non-emitted region onto which the optical pattern of the target object is not projected; and processing means that calculates a phase of the optical pattern at a pixel included in an image obtained by removing background information from images taken by the first and second line sensors based on a brightness value of the pixel and a neighboring pixel in the image, and calculates height information of the target object based on the calculated phase, wherein the first and second line sensors are arranged at such positions that the first and second line sensors can respectively image the optical pattern-emitted region and the optical pattern-non-emitted region at a time.

Therefore, the target object can be imaged at a high resolution while reducing the number of times the target object is moved relatively in the main scan direction with respect to the line sensor. Further, when the image from which background information is removed is calculated, the required images in the optical pattern-emitted region and the optical pattern-non-emitted region can be taken in one shot. Therefore, one or more embodiments of the present invention achieves the effect of providing the three-dimensional shape measuring apparatus capable of reducing the cost and increasing the imaging rate.

In the three-dimensional shape measuring apparatus 10 according to one or more embodiments of the present invention, the first and second line sensors are arranged at such positions that the first and second line sensors can respectively image, at a time, the emitted region and the non-emitted region. When the phase of the optical pattern is calculated based on a brightness value of the pixel and a neighboring pixel in the image, and the image from which background information is removed is calculated in order to calculate the height information of the target object based on the calculated phase, the necessary image can be taken in one shot. Therefore, the three-dimensional shape measuring apparatus is provided that can reduce the cost and increase the imaging rate.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A three-dimensional shape measuring apparatus for measuring a three-dimensional shape of a target object by analyzing an optical pattern projected onto the target object, the three-dimensional shape measuring apparatus comprising:
   optical pattern projecting means that projects the optical pattern onto a portion of a measurement surface on which the target object is placed, the optical pattern having brightness changing periodically according to a position;
   a first line sensor that images an optical pattern-emitted region onto which the optical pattern of the target object is projected;
   a second line sensor that images an optical pattern-non-emitted region onto which the optical pattern of the target object is not projected; and
   processing means that calculates a phase of the optical pattern at a pixel included in an image obtained by removing background information from images taken by the first and second line sensors based on a brightness value of the pixel and a neighboring pixel in the image, and calculates height information of the target object based on the calculated phase,
   wherein the first and second line sensors are arranged at such positions that the first and second line sensors can respectively image the optical pattern-emitted region and the optical pattern-non-emitted region at a time, and wherein a uniform illumination is emitted to the optical pattern-non-emitted region.

2. The three-dimensional shape measuring apparatus according to claim 1, comprising:
   imaging means that includes a plurality of line sensors,
   wherein two of the plurality of line sensors of the imaging means are used as the first line sensor and the second line sensor.

3. The three-dimensional shape measuring apparatus according to claim 2, comprising:
   a pattern generator that includes a transparent section and a shielding section for forming the optical pattern on the optical pattern-emitted region and emitting the uniform illumination on the optical pattern-non-emitted region.

4. The three-dimensional shape measuring apparatus according to claim 2, further comprising:
   uniform illumination projecting means that projects onto the optical pattern-non-emitted region the uniform illumination having the same amount of light as that of the optical pattern projected by the optical pattern projecting means.

5. The three-dimensional shape measuring apparatus according to claim 1, comprising:
   color imaging means that includes a line sensor for detecting brightness of colors of red, green, blue, black and white, wherein
      the line sensor for black and white is used as the first line sensor, and
      the line sensor for red, green and blue is used as the second line sensor.

6. The three-dimensional shape measuring apparatus according to claim 5, comprising:
   a pattern generator that includes a transparent section and a shielding section for forming the optical pattern on the optical pattern-emitted region and emitting the uniform illumination on the optical pattern-non-emitted region.

7. The three-dimensional shape measuring apparatus according to claim 5, further comprising:
   uniform illumination projecting means that projects onto the optical pattern-non-emitted region the uniform illumination having the same amount of light as that of the optical pattern projected by the optical pattern projecting means.

8. The three-dimensional shape measuring apparatus according to claim 1, comprising:
   color imaging means that includes a line sensor for detecting brightness of colors of red, green, blue, black and white, wherein
      a sensor including the line sensor for black and white and a filter for any one of the colors of red, green, and blue is used as the first line sensor, and
      a line sensor for one of the colors of red, green, and blue that is the same color as the color of the filter is used as the second line sensor.

9. The three-dimensional shape measuring apparatus according to claim 8, wherein the first line sensor and the second line sensor image the optical pattern-emitted region and the optical pattern-non-emitted region through an identical lens.

10. The three-dimensional shape measuring apparatus according to claim 8, comprising:
    a pattern generator that includes a transparent section and a shielding section for forming the optical pattern on the optical pattern-emitted region and emitting the uniform illumination on the optical pattern-non-emitted region.

11. The three-dimensional shape measuring apparatus according to claim 8, further comprising:

uniform illumination projecting means that projects onto the optical pattern-non-emitted region the uniform illumination having the same amount of light as that of the optical pattern projected by the optical pattern projecting means.

12. The three-dimensional shape measuring apparatus according to claim 1, comprising:
first imaging means that has a first line sensor;
second imaging means that has a second line sensor;
a first mirror that is arranged such that a visual axis of the first line sensor faces the optical pattern-emitted region; and
a second mirror that is arranged such that a visual axis of the second line sensor faces the optical pattern-non-emitted region.

13. The three-dimensional shape measuring apparatus according to claim 12, comprising:
a pattern generator that includes a transparent section and a shielding section for forming the optical pattern on the optical pattern-emitted region and emitting the uniform illumination on the optical pattern-non-emitted region.

14. The three-dimensional shape measuring apparatus according to claim 12, further comprising:
uniform illumination projecting means that projects onto the optical pattern-non-emitted region the uniform illumination having the same amount of light as that of the optical pattern projected by the optical pattern projecting means.

15. The three-dimensional shape measuring apparatus according to claim 1, comprising:
a pattern generator that includes a transparent section and a shielding section for forming the optical pattern on the optical pattern-emitted region and emitting the uniform illumination on the optical pattern-non-emitted region.

16. The three-dimensional shape measuring apparatus according to claim 1, further comprising:
uniform illumination projecting means that projects onto the optical pattern-non-emitted region the uniform illumination having the same amount of light as that of the optical pattern projected by the optical pattern projecting means.

17. A three-dimensional shape measuring method for a three-dimensional shape measuring apparatus that measures a three-dimensional shape of a target object by analyzing an optical pattern projected onto the target object,
wherein the three-dimensional shape measuring apparatus includes optical pattern projecting means, a first line sensor, and a second line sensor, and
wherein the first and second line sensors are arranged at such positions that the first and second line sensors can respectively image, at a time, an optical pattern-emitted region onto which the optical pattern of the target object is projected and an optical pattern-non-emitted region onto which the optical pattern of the target object is not projected,
wherein a uniform illumination is emitted to the optical pattern-non-emitted region;
the three-dimensional shape measuring method comprising:
an optical pattern projecting step in which the optical pattern projecting means projects the optical pattern onto a portion of a measurement surface on which the target object is placed, the optical pattern having brightness changing periodically according to a position;
an imaging step in which the first line sensor images the optical pattern-emitted region, and the second line sensor images the optical pattern-non-emitted region; and
a calculation step including:
calculating a phase of the optical pattern at a pixel included in an image obtained by removing background information from images taken by the first and second line sensors, based on a brightness value of the pixel and a neighboring pixel in the image; and
calculating height information of the target object based on the calculated phase.

18. A three-dimensional shape measuring program, stored on a non-transitory computer readable medium, for executing a three-dimensional shape measuring method for a three-dimensional shape measuring apparatus that measures a three-dimensional shape of a target object by analyzing an optical pattern projected onto the target object, the three-dimensional shape measuring apparatus comprising:
optical pattern projecting means that projects the optical pattern onto a portion of a measurement surface on which the target object is placed, the optical pattern having brightness changing periodically according to a position;
a first line sensor that images an optical pattern-emitted region onto which the optical pattern of the target object is projected; and
a second line sensor that images an optical pattern-non-emitted region onto which the optical pattern of the target object is not projected,
wherein a uniform illumination is emitted to the optical pattern-non-emitted region,
wherein the first and second line sensors are arranged at such positions that the first and second line sensors can respectively image, at a time, the optical pattern-emitted region and the optical pattern-non-emitted region, and
wherein the three-dimensional shape measuring program causes a computer to execute a calculation step including:
calculating a phase of the optical pattern at a pixel included in an image obtained by removing background information from images taken by the first and second line sensors, based on a brightness value of the pixel and a neighboring pixel in the image; and
calculating height information of the target object based on the calculated phase.

* * * * *